(12) United States Patent
Zheleznyak

(10) Patent No.: US 12,298,600 B2
(45) Date of Patent: *May 13, 2025

(54) MYOPIA PROGRESSION TREATMENT

(71) Applicant: Clerio Vision, Inc., Rochester, NY (US)

(72) Inventor: Leonard Zheleznyak, Pittsford, NY (US)

(73) Assignee: Clerio Vision, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,616

(22) Filed: May 12, 2023

(65) Prior Publication Data

US 2023/0280600 A1 Sep. 7, 2023

Related U.S. Application Data

(63) Continuation of application No. 16/928,505, filed on Jul. 14, 2020, now Pat. No. 11,693,257.

(60) Provisional application No. 62/876,126, filed on Jul. 19, 2019.

(51) Int. Cl.
*G02C 7/02* (2006.01)
*G02C 7/04* (2006.01)

(52) U.S. Cl.
CPC .............. *G02C 7/027* (2013.01); *G02C 7/022* (2013.01); *G02C 7/044* (2013.01); *G02C 2202/24* (2013.01)

(58) Field of Classification Search
CPC ........ G02C 7/027; G02C 7/022; G02C 7/044; G02C 2202/24

USPC ..................................................... 351/159.79
See application file for complete search history.

(56) References Cited

U.S. PATENT DOCUMENTS

| | | | |
|---|---|---|---|
| 5,849,006 A | 12/1998 | Frey et al. | |
| 6,261,220 B1 | 7/2001 | Frey et al. | |
| 6,271,914 B1 | 8/2001 | Frey et al. | |
| 6,720,221 B1 | 4/2004 | Ahn et al. | |
| 6,830,332 B2 | 12/2004 | Piers et al. | |
| 7,001,374 B2 * | 2/2006 | Peyman ............... | A61F 2/147 606/5 |
| 7,677,725 B2 | 3/2010 | Piers et al. | |

(Continued)

FOREIGN PATENT DOCUMENTS

| | | |
|---|---|---|
| CN | 107861262 A | 3/2018 |
| FR | 2989179 A3 | 10/2013 |

(Continued)

OTHER PUBLICATIONS

Aguila-Carrasco et al., "Aberrations and Accommodation", Clinical and Experimental Optometry, vol. 103, Jul. 8, 2019, pp. 95-103.

(Continued)

*Primary Examiner* — Robert E. Tallman
(74) *Attorney, Agent, or Firm* — Kilpatrick Townsend & Stockton LLP

(57) ABSTRACT

A ophthalmic lens for inhibiting progression of myopia includes a central zone and an annular zone. The annular zone includes subsurface optical elements formed via laser-induced changes in refractive index of a material forming the annular zone. The subsurface optical elements are configured to modify distribution of light to the peripheral retina of a user so as to inhibit progression of myopia.

19 Claims, 24 Drawing Sheets

(56) References Cited

U.S. PATENT DOCUMENTS

| | | |
|---|---|---|
| 7,789,910 B2 | 9/2010 | Knox et al. |
| 8,337,553 B2 | 12/2012 | Knox et al. |
| 8,512,320 B1 | 8/2013 | Knox et al. |
| 8,617,147 B2 | 12/2013 | Knox et al. |
| 8,901,190 B2 | 12/2014 | Smith et al. |
| 8,932,352 B2 | 1/2015 | Knox et al. |
| 9,060,847 B2 | 6/2015 | Smith et al. |
| 9,144,491 B2 | 9/2015 | Knox et al. |
| 9,492,323 B2 | 11/2016 | Knox et al. |
| 9,545,340 B1 | 1/2017 | Knox et al. |
| 9,622,912 B2 | 4/2017 | Knox et al. |
| 9,939,558 B2 | 4/2018 | Knox et al. |
| 10,226,381 B2 | 3/2019 | Knox et al. |
| 10,932,901 B2 | 3/2021 | Zheleznyak et al. |
| 2005/0187622 A1 | 8/2005 | Sandstedt et al. |
| 2008/0001320 A1 | 1/2008 | Knox et al. |
| 2011/0037944 A1 | 2/2011 | Varnas |
| 2012/0081661 A1 | 4/2012 | Yamakaji |
| 2012/0150166 A1* | 6/2012 | Neev ............... A61B 18/203 607/2 |
| 2012/0310223 A1 | 12/2012 | Knox et al. |
| 2013/0010255 A1 | 1/2013 | Holden et al. |
| 2013/0178934 A1 | 7/2013 | Knox et al. |
| 2013/0226162 A1 | 8/2013 | Knox et al. |
| 2013/0278888 A1 | 10/2013 | Bakaraju et al. |
| 2014/0104563 A1* | 4/2014 | Bakaraju ........... G02B 27/0018 351/159.52 |
| 2014/0268029 A1 | 9/2014 | Pugh et al. |
| 2015/0277145 A1 | 10/2015 | Bakaraju et al. |
| 2015/0277150 A1 | 10/2015 | Granger et al. |
| 2016/0144580 A1 | 5/2016 | Knox et al. |
| 2017/0035613 A1 | 2/2017 | Knox et al. |
| 2017/0119581 A1 | 5/2017 | Gray et al. |
| 2017/0146820 A1 | 5/2017 | Brennan et al. |
| 2017/0176772 A1 | 6/2017 | Bakaraju et al. |
| 2017/0181846 A1 | 6/2017 | Knox et al. |
| 2018/0021172 A1 | 1/2018 | Zheleznyak et al. |
| 2018/0132996 A1 | 5/2018 | Tiwari et al. |
| 2018/0173009 A1 | 6/2018 | Knox et al. |
| 2018/0206979 A1 | 7/2018 | Knox et al. |
| 2018/0231696 A1 | 8/2018 | Knox et al. |
| 2018/0243082 A1* | 8/2018 | Zheleznyak ........ A61F 9/00829 |
| 2018/0373060 A1 | 12/2018 | Knox et al. |
| 2019/0046357 A1 | 2/2019 | Knox et al. |
| 2019/0072786 A1 | 3/2019 | Krause et al. |
| 2019/0343683 A1 | 11/2019 | Zheleznyak et al. |
| 2020/0054485 A1 | 2/2020 | Knox |
| 2021/0018762 A1 | 1/2021 | Zheleznyak |
| 2021/0356767 A1 | 11/2021 | Kubota et al. |

FOREIGN PATENT DOCUMENTS

| | | |
|---|---|---|
| WO | 2008002796 A2 | 1/2008 |
| WO | 2009143054 A2 | 11/2009 |
| WO | 2012166696 A1 | 12/2012 |
| WO | 2015006274 A1 | 1/2015 |
| WO | WO-2016070243 A1 * | 5/2016 ............... G02C 7/02 |
| WO | 2016196200 A1 | 12/2016 |
| WO | 2017106321 A1 | 6/2017 |
| WO | 2018152595 A1 | 8/2018 |
| WO | 2018182946 A1 | 10/2018 |
| WO | 2019010345 A1 | 1/2019 |
| WO | 2019147952 A1 | 8/2019 |
| WO | 2020102514 A1 | 5/2020 |
| WO | 2021108585 A1 | 6/2021 |

OTHER PUBLICATIONS

Atchison et al., "Chromatic Dispersions of the Ocular Media of Human Eyes", Journal of the Optical Society of America A, vol. 22, No. 1, Jan. 2005, pp. 29-37.

Banks et al., "ChromaBlur: Rendering Natural Chromatic Aberration Drives Accommodation Effectively", Journal of Vision, vol. 18, No. 10, Abstract only, Sep. 2018, 2 pp.

Banks et al., "Peripheral Spatial Vision: Limits Imposed by Optics, Photoreceptors, and Receptor Pooling", Journal of the Optical Society of America, vol. 8, No. 11, Nov. 1991, pp. 1775-1787.

Bao et al., "One-year myopia control efficacy of spectacle lenses with aspherical lenslets", Br J Ophthalmol, 106, 2022, pp. 1171-1176.

Benedi-Garcia et al., "Vision is Protected Against Blue Defocus", Scientific Reports, vol. 11, Jan. 11, 2021, pp. 1-9.

Bloomfield, "Orientation-Sensitive Amacrine and Ganglion Cells in the Rabbit Retina", Journal of Neurophysiology, vol. 71, No. 5, May 1994, pp. 1672-1691.

Bloomfield, "Two Types of Orientation-Sensitive Responses of Amacrine Cells in the Mammalian Retina", Nature, vol. 350, Mar. 28, 1991, pp. 347-350.

Chen et al., "Accommodation with Higher-order Monochromatic Aberrations Corrected with Adaptive Optics", Journal of the Optical Society of America A, vol. 23, No. 1, Jan. 2006, pp. 1-8.

Cholewiak et al., "ChromaBlur: Rendering Chromatic Eye Aberration Improves Accommodation and Realism", ACM Transactions on Graphics, vol. 36, No. 6, Nov. 2017, pp. 1-12.

Cholewiak et al., "ChromaBlur: Rendering Chromatic Eye Aberration Improves Accommodation and Realism in HMDs", ACM Transactions on Graphics, vol. 36, No. 6, Article 210, Nov. 2017, pp. 210:1 thru 210:12.

Cholewiak et al., "Creating Correct Blur and Its Effect on Accommodation", Journal of Vision, vol. 18, No. 9, Sep. 4, 2018, pp. 1-29.

Fernandez et al., "Adaptation to the Eye's Chromatic Aberration Measured with an Adaptive Optics Visual Simulator", Optics Express, vol. 28, No. 25, Nov. 30, 2020, pp. 37450-37458.

Flitcroft et al., "IMI—Defining and Classifying Myopia: A Proposed Set of Standards for Clinical and Epidemiologic Studies", Investigative Ophthalmology & Visual Science, vol. 60, No. 3, Feb. 2019, pp. M20-M30.

Gantes-Nunez et al., "Optical characterisation of two novel myopia control spectacle lenses", Ophthalmic Physiol Opt., 43, 2023, pp. 388-401.

Gawne et al., "An Opponent Dual-detector Spectral Drive Model of Emmetropization", Vision Research, vol. 173, Aug. 2020, pp. 7-20.

Gawne et al., "Chromatically Simulated Myopic Blur Counteracts a Myopiagenic Environment", Experimental Eye Research, vol. 222, Sep. 2022, pp. 1-6.

Gawne et al., "How Chromatic Cues can Guide Human Eye Growth to Achieve Good Focus", Journal of Vision, vol. 21, No. 5, May 13, 2021, pp. 1-11.

Gifford et al., "IMI—Clinical Management Guidelines Report", IOVS, Special Issue, vol. 60, No. 3, pp. M184-M203.

Graef et al., "Control of Accommodation by Longitudinal Chromatic Aberration and Blue Cones", Journal of Vision, vol. 12, Jan. 18, 2012, pp. 1-12.

Hiraoka et al., "Relationships Between Higher-order Wavefront Aberrations and Natural Progression of Myopia in Schoolchildren", Scientific Reports, vol. 7, Article No. 7876, Aug. 11, 2017, 9 Pages.

Huang et al., "Efficacy Comparison of 16 Interventions for Myopia Control in Children", America Academy of Ophthalmology, vol. 123, No. 4, Apr. 2016, pp. 697-708.

Jaskulski et al., "The Effect of Longitudinal Chromatic Aberration on the Lag of Accommodation and Depth of Field", Ophthalmic & Physiological Optics, vol. 36, No. 6, Nov. 2016, pp. 657-663.

Jiang et al., "Measuring and Compensating for Ocular Longitudinal Chromatic Aberration", Optica, vol. 6, No. 8, Aug. 2019, pp. 981-990.

Lam et al., "Defocus Incorporated Multiple Segments (DIMS) spectacle lenses slow myopia progression: a 2-year randomised clinical trial", Br J Ophthalmol, 104, 2020, pp. 363-368.

Leung et al., "Meridional Anisotropy of Foveal and Peripheral Resolution Acuity in Adults with Emmetropia, Myopia, and Astigmatism", Investigative Ophthalmology & Visual Science, vol. 62, No. 10, Aug. 2021, pp. 1-6.

Levick et al., "Analysis of Orientation Bias in Cat Retina", The Journal of Physiology, vol. 329, Aug. 1982, pp. 243-261.

(56) References Cited

OTHER PUBLICATIONS

Li et al., "Studies Using Concentric Ring Bifocal and Peripheral Add Multifocal Contact Lenses to Slow Myopia Progression in School-Aged Children: A Meta-Analysis", Ophthalmic & Physiological Optics, vol. 37, No. 1, Jan. 2017, pp. 51-59.
Lopez-Gil et al., "New Intraocular Lens for Achromatizing the Human Eye", Journal of Cataract and Refractive Surgery, vol. 33, No. 7, Aug. 2007, pp. 1296-1302.
Marcos et al., "A New Approach to the Study of Ocular Chromatic Aberrations", Vision Research, vol. 39, No. 26, Dec. 1999, pp. 4309-4323.
Martinez et al., "Chromatic Aberration Control with Liquid Crystal Spatial Phase Modulators", Optics Express, vol. 25, No. 9, May 1, 2017, pp. 9793-9801.
Mclellan et al., "Imperfect Optics May be the Eye's Defence Against Chromatic Blur", Nature, vol. 417, May 9, 2002, pp. 174-176.
Moreno et al., "Modulation Light Efficiency of Diffractive Lenses Displayed in a Restricted Phase-Mostly Modulation Display", Applied Optics, vol. 43, No. 34, Dec. 1, 2004, pp. 6278-6284.
Passaglia et al., "Orientation Sensitivity of Ganglion Cells in Primate Retina", Vision Research, vol. 42, Mar. 2002, pp. 683-694.
Powell, "Lenses for Correcting Chromatic Aberration of the Eye", Applied Optics, vol. 20, No. 24, Dec. 15, 1981, pp. 4152-4155.
Resnikoff et al., "Myopia—A 21st Century Public Health Issue", Investigative Ophthalmology & Visual Science, vol. 60, No. 3, Feb. 2019, pp. Mi-Mii.
Rohrer et al., "Longitudinal Chromatic Aberration and Emmetropization: Results from the Chicken Eye", Journal of Physiology, vol. 449, Apr. 1992, pp. 363-376.
Romashchenko et al., "Peripheral refraction and higher order aberrations", Clinical and Experimental Optometry 103.1, Jan. 2020, pp. 86-94.
Rucker et al., "Chick Eyes Compensate for Chromatic Simulations of Hyperopic and Myopic Defocus: Evidence that the Eye Uses Longitudinal Chromatic Aberration to Guide Eye-growth", Vision Research, vol. 49, No. 14, Jul. 2009, pp. 1775-1783.
Rucker et al., "Signals for Defocus Arise from Longitudinal Chromatic Aberration in Chick", Experimental Eye Research, vol. 198, Sep. 2020, 10 pages.
Rucker, "The Role of Luminance and Chromatic Cues in Emmetropisation", Ophthalmic & Physiological Optics, vol. 33, No. 3, May 2013, pp. 196-214.
Savage et al., "First Demonstration of Ocular Refractive Change Using Blue-IRIS in Live Cats", Investigative Ophthalmology & Visual Science, vol. 55, No. 7, Jul. 1, 2014, pp. 4603-4612.
Schall et al., "Retinal Ganglion Cell Dendritic Fields in Old-World Monkeys are Oriented Radially", Brain Research, vol. 368, Mar. 1986, pp. 18-23.
Seidemann et al., "Effects of Longitudinal Chromatic Aberration on Accommodation and Emmetropization", Vision Research, vol. 42, No. 21, Sep. 2002, pp. 2409-2417.
Si et al., "Orthokeratology for Myopia Control: A Meta-Analysis", Optometry and Vision Science, vol. 92, No. 3, Mar. 2015, pp. 252-257.
Smith et al., "Peripheral Vision Can Influence Eye Growth and Refractive Development in Infant Monkeys", Investigative Ophthalmology & Visual Science, vol. 46, No. 11, Nov. 2005, 16 Pages.
Suchkov et al., "Impact of Longitudinal Chromatic Aberration on Through-focus Visual Acuity", Optics Express, vol. 27, No. 24, Nov. 25, 2019, pp. 35935-35947.
Swiatczak et al., "Myopia: Why the Retina Stops Inhibiting Eye Growth", Scientific Reports, vol. 12, Dec. 15, 2022, pp. 1-9.
Tedja et al., "IMI—Myopia Genetics Report", Investigative Ophthalmology & Visual Science, vol. 60, No. 3, Feb. 2019, pp. M89-M105.
Troilo et al., "IMI—Report on Experimental Models of Emmetropization And Myopia", Investigative Ophthalmology & Visual Science, vol. 60, No. 3, Feb. 2019, pp. M31-M88.
Weeber et al., "Theoretical Performance of Intraocular Lenses Correcting Both Spherical and Chromatic Aberration", Journal of Refractive Surgery, vol. 28, No. 1, Jan. 2012, pp. 48-52.
Wildsoet et al., "IMI—Interventions for Controlling Myopia Onset and Progression Report", Investigative Ophthalmology & Visual Science, vol. 60, No. 3, Feb. 2019, pp. M106-M131.
Wolffsohn et al., "IMI—Clinical Myopia Control Trials and Instrumentation Report", Investigative Ophthalmology & Visual Science, vol. 60, No. 3, Feb. 2019, pp. M132-M160.
Wolffsohn et al., "IMI—Myopia Control Reports Overview and Introduction", Investigative Ophthalmology & Visual Science, vol. 60, No. 3, Feb. 2019, pp. M1-M19.
Xu et al., "Noninvasive Intratissue Refractive Index Shaping (IRIS) of the Cornea with Blue Femtosecond Laser Light", Investigative Ophthalmology & Visual Science, vol. 52, No. 11, Oct. 17, 2011, pp. 8148-8155.
Zheleznyak et al., "Optical and Neural Anisotropy in Peripheral Vision", Journal of Vision, vol. 16, No. 5, Mar. 2016, pp. 1-11.

\* cited by examiner

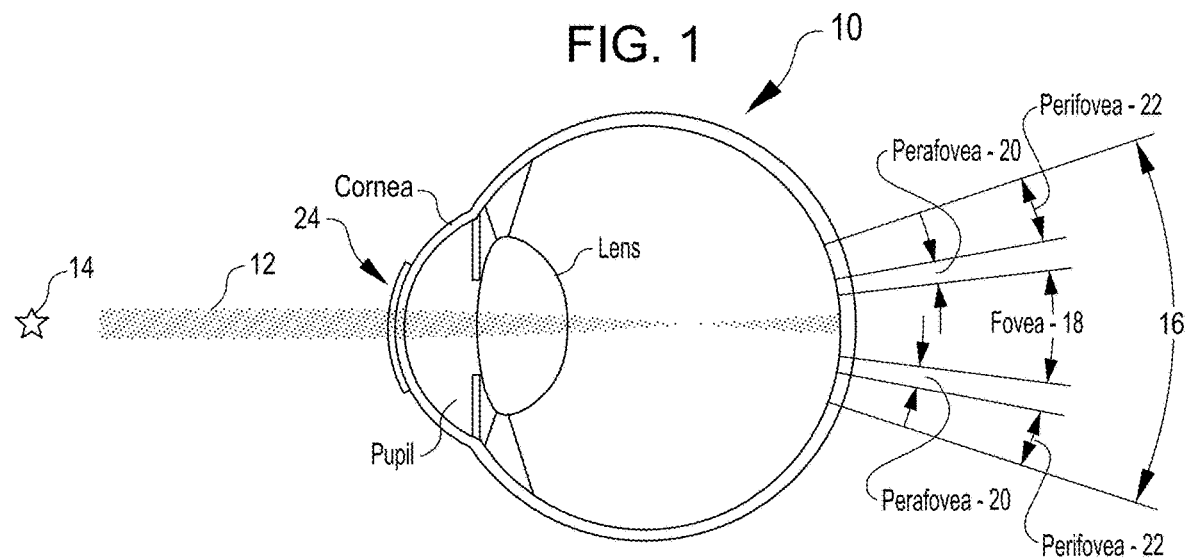
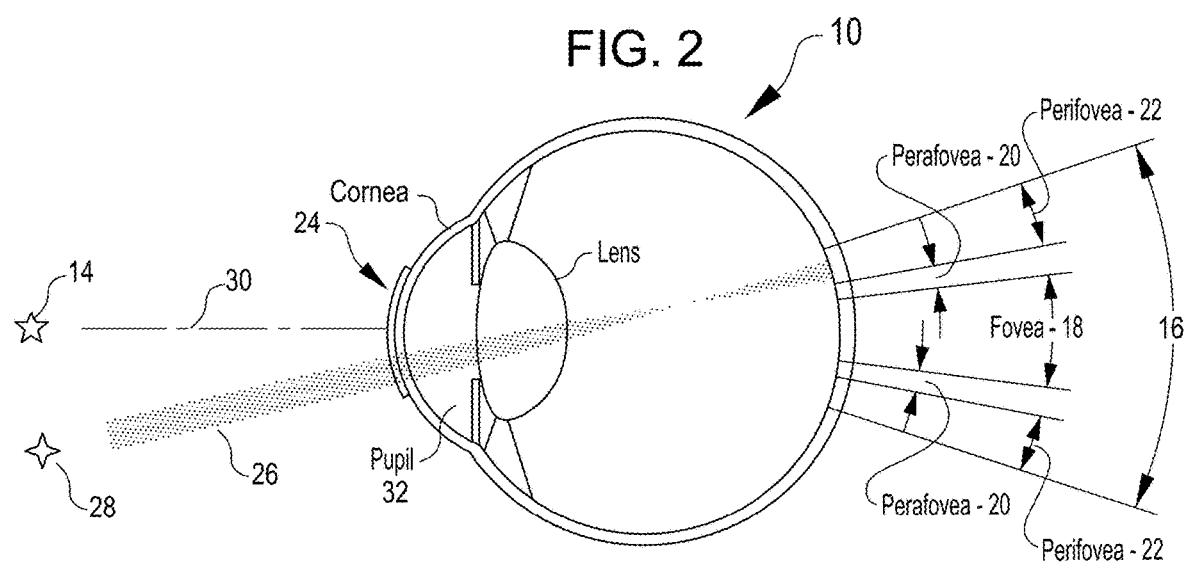

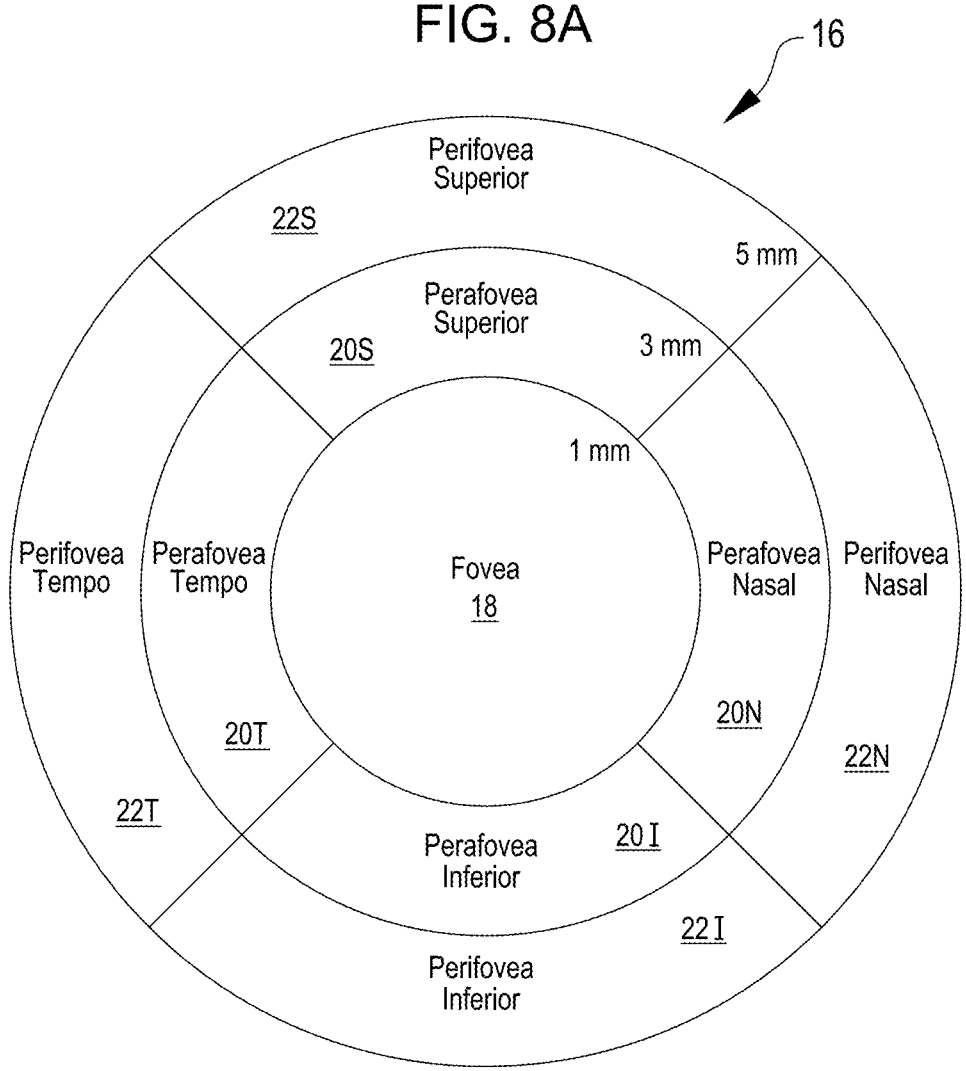

Percent of peripheral annular zone contributing to peripheralretinal image

Anterior chamber depth

Computational Details:
- 4mm pupil diameter
- 4mm central optical zone diameter
- 4mm anterior chamber depth

FIG. 25

Average change in aberrations from 0 deg to 20 deg nasal retinal eccentricity

| 4mm Pupil n=10 | | | | | | | | | | | | |
|---|---|---|---|---|---|---|---|---|---|---|---|---|
| Astig. | Defocus | Astig. | | Trefoil | Coma | Coma | Trefoil | Quasdraf. | | SA | | Quasdraf. |
| Z3 | Z4 | Z5 | | Z6 | Z7 | Z8 | Z9 | Z10 | Z11 | Z12 | Z13 | Z14 |
| -0.072 | 0.264 | 0.419 | | -0.004 | -0.011 | -0.110 | -0.028 | 0.001 | -0.006 | -0.007 | 0.004 | 0.002 |

MYOPIA PROGRESSION TREATMENT

CROSS REFERENCE TO RELATED APPLICATION DATA

The present application is a Continuation of U.S. patent application Ser. No. 16/928,505 filed Jul. 14, 2020 (Allowed); which claims the benefit of U.S. Provisional Appln. No. 62/876,126 filed Jul. 19, 2019; the full disclosures which are incorporated herein by reference in their entirety for all purposes.

BACKGROUND

Myopia (aka nearsightedness) is an optical condition where close objects are seen clearly and distant objects appear blurry. Myopia can be caused by the eyeball being too long and/or the cornea being too curved so that the light from a distant object is focused in front of the retina.

Myopia is the most common form of impaired vision under the age 40. The prevalence of Myopia is growing at an alarming rate. It is estimated that about 25 percent of people in the world in the year 2000 were myopic. It is projected that about 50 percent of the people in the world in the year 2050 will be myopic.

Typically, myopia develops during childhood due, at least in part, to eye growth that occurs during childhood, and progresses until about age 20. Myopia may also develop after childhood due to visual stress or health conditions such as diabetes.

A person with myopia has increased risk of other optical maladies. For example, a myopic person has significantly increased risk of developing cataracts, glaucoma, and retinal detachment. Additionally, many people with high myopia are not well-suited for LASIK or other laser refractive surgery.

BRIEF SUMMARY

Embodiments described herein are directed to ophthalmic lenses, and related methods, that modify images formed on the peripheral retina so as to inhibit progression of myopia. In many embodiments, an ophthalmic lens includes an annular zone in which subsurface optical elements are formed via laser induced changes in refractive index. The subsurface optical elements modify distribution of light to the peripheral retina of a user associated with the ophthalmic lens so as to reduce stimulus on the peripheral retina associated with eye growth, which has been identified as exacerbating myopia progression.

Thus, in one aspect, an ophthalmic lens includes a central zone and an annular zone. The annular zone includes subsurface optical elements formed via laser-induced changes in refractive index of a material forming the annular zone. The subsurface optical elements are configured to modify distribution of light to the peripheral retina of a user associated with the ophthalmic lens so as to inhibit progression of myopia.

The subsurface optical elements can be configured to provide any one or more of any suitable optical modification to distribution of light to the peripheral retina of the wearer of the contact lens so as to inhibit progression of myopia. For example, the subsurface optical elements can be configured to accomplish any one or more of the following: (1) reduce asymmetry of a radial versus azimuthal contrast in the peripheral retina of the wearer of the contact lens, (2) reduce hyperopia in the peripheral retina of the wearer of the contact lens, (3) increase depth of focus in the peripheral retina of the wearer of the contact lens, (4) decrease depth of focus in the peripheral retina of the wearer of the contact lens, and/or (5) increase asymmetry of a radial versus azimuthal contrast in the peripheral retina of the wearer of the contact lens.

In some embodiments, the annular zone includes two or more annular portions. The subsurface optical elements in each of the two or more annular portions can be configured to provide any one or more of any suitable optical modification to distribution of light to the peripheral retina of the wearer of the contact lens so as to inhibit progression of myopia. For example, the subsurface optical elements in each of the two or more annular portions can be configured to accomplish any one or more of the following: (1) reduce asymmetry of a radial versus azimuthal contrast in the peripheral retina of the wearer of the contact lens, (2) reduce hyperopia in the peripheral retina of the wearer of the contact lens, (3) increase depth of focus in the peripheral retina of the wearer of the contact lens, (4) decrease depth of focus in the peripheral retina of the wearer of the contact lens, and/or (5) increase asymmetry of a radial versus azimuthal contrast in the peripheral retina of the wearer of the contact lens.

In another aspect, a method of modifying an ophthalmic lens includes inducing subsurface changes in refractive index of a material forming an annular zone of the ophthalmic lens to form subsurface optical elements configured to modify distribution of light to the peripheral retina of a user associated with the ophthalmic lens so as to inhibit progression of myopia. In many embodiments, the subsurface changes in refractive index are induced by subjecting the material to pulses of laser light.

The subsurface changes in refractive index can be induced using suitable pulses of laser light. For example, each of the pulses of laser light can have a duration in a range from 10 femtoseconds to 500 femtoseconds. In some embodiments, the laser light has a wavelength of about 405 nm. In some embodiments, the laser light has a wavelength of about 810 nm. In some embodiments, the laser light has a wavelength of about 1035 nm. In some embodiments, each of the pulses of laser light have a duration in a range from 10 femtoseconds to 50 femtoseconds.

In some embodiments, the method includes measuring a radial versus azimuthal contrast of light incident on a location of the peripheral retina. The subsurface optical elements can be configured to reduce asymmetry of the radial versus azimuthal contrast of the light incident on the location of the peripheral retina.

In some embodiments of the method, the subsurface optical elements can be configured to provide any one or more of any suitable optical modification to distribution of light to the peripheral retina of the user so as to inhibit progression of myopia. For example, the subsurface optical elements can be configured to accomplish any one or more of the following: (1) reduce asymmetry of a radial versus azimuthal contrast in the peripheral retina of the user, (2) reduce hyperopia in the peripheral retina of the user, (3) increase depth of focus in the peripheral retina of the user, (4) decrease depth of focus in the peripheral retina of the user, and/or (5) increase asymmetry of a radial versus azimuthal contrast in the peripheral retina of the user.

In some embodiments of the method, the annular zone includes two or more annular portions. The subsurface optical elements in each of the two or more annular portions can be configured to provide any one or more of any suitable optical modification to distribution of light to the peripheral retina of the user so as to inhibit progression of myopia. For example, the subsurface optical elements in each of the two or more annular portions can be configured to accomplish any one or more of the following: (1) reduce asymmetry of a radial versus azimuthal contrast in the peripheral retina of the user, (2) reduce hyperopia in the peripheral retina of the user, (3) increase depth of focus in the peripheral retina of the user, (4) decrease depth of focus in the peripheral retina of the user, and/or (5) increase asymmetry of a radial versus azimuthal contrast in the peripheral retina of the user.

BRIEF DESCRIPTION OF THE DRAWINGS

FIG. 1 shows a cross-sectional view of an eye that illustrates transmission of light from an object located in the center of a field of view, through a central zone of an ophthalmic lens, to the fovea.

FIG. 2 shows a cross-sectional view of an eye that illustrates transmission of light from an object located in the periphery of a field of view, through an annular zone of an ophthalmic lens, to the perifovea.

FIG. 8A is a simplified schematic drawing showing regions of a retina.

FIG. 25 shows example average changes in optical aberrations from 0 degree to 20 degree retinal eccentricity for a group of 10 individuals.

DETAILED DESCRIPTION

Figure 3:
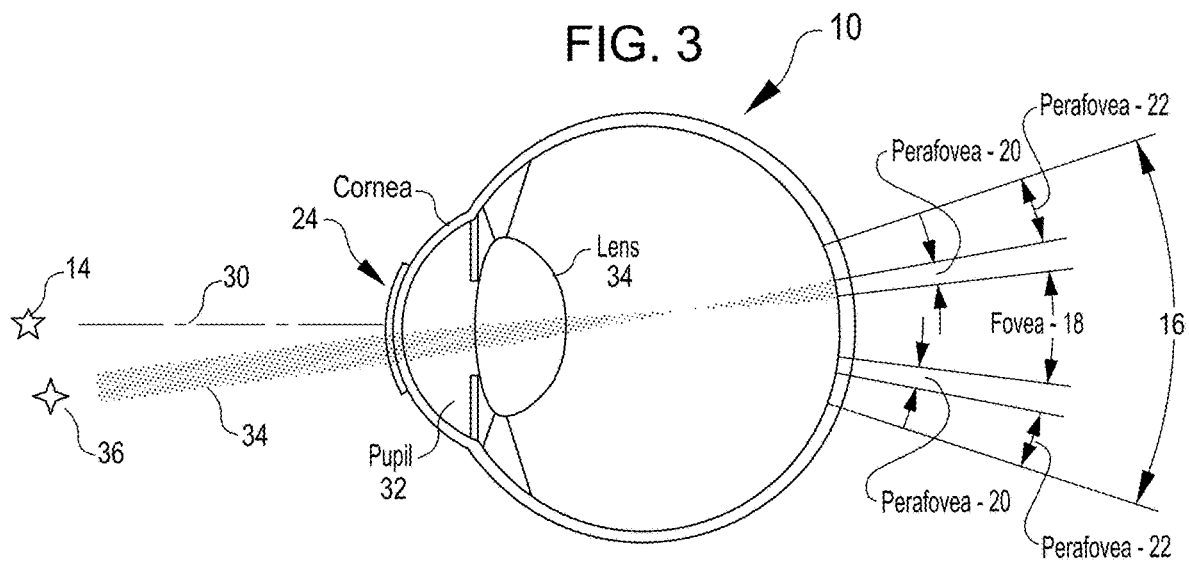
FIG. 3 shows a cross-sectional view of an eye that illustrates transmission of light from an object located in the periphery of a field of view, through a central zone and an annular zone of an ophthalmic lens, to the perafovea.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Ophthalmic lenses described herein include subsurface optical elements configured to impart an optical correction to light focused on a peripheral retina so as to reduce progression of myopia. In many embodiments, the subsurface optical elements are disposed in an annular zone of the ophthalmic lens and are formed via laser-induced changes in refractive index of a material forming the annular zone. In many embodiments, optical aberrations are measured for one or more locations in a peripheral retina of a subject. In many embodiments, based on the measured optical aberrations, a myopia progression inhibiting optical correction is determined for each of the one or more locations in the peripheral retina of the subject. In many embodiments, surface refractive index changes are determined for forming the subsurface optical elements configured to provide the myopia progression inhibiting optical correction for each of the one or more locations in the peripheral retina. In many embodiments, the subsurface refractive index changes are induced by focusing laser light to corresponding subsurface locations in respective one or more annular zones of an ophthalmic lens. In many embodiments, each of the one or more annular zones of the ophthalmic lens is positioned opposite to the associated location in the peripheral retina with respect to the optical axis of an eye having the peripheral retina. Ophthalmic lens configured as described herein to inhibit progression of myopia can be any suitable type of ophthalmic lens including, for example, spectacles (aka glasses), contact lenses, corneas, native lenses, and intraocular lenses.

Turning now to the drawing figures in which the same or similar reference numbers refer to the same or similar elements in the drawing figures, FIG. 1 shows a cross-sectional view of an eye 10 that illustrates transmission of light 12 to the retina 16 of the eye 10 from a first object 14 disposed at a first location so as to be in the center of a field of view of the eye 10. The retina 16 includes the fovea 18, the perafovea 20, and the perifovea 22. The fovea 18 is the central portion of the retina 16. The perafovea 20 and the perifovea 22 form the peripheral portion of the retina. Retinal cones are concentrated in the fovea 18. The light 12 is incident upon the fovea 18, thereby providing the highest visual acuity to the center of field of view. In the illustrated embodiment, the light 12 passes through a central portion of a contact lens 24 worn on the eye 10. The contact lens 24 is an example of a type of ophthalmic lens that can have subsurface optical elements configured to inhibit progression of myopia as described herein. In alternate embodiments, the cornea of the eye 10, the lens of the eye 10, spectacles, and/or an intraocular lens can be configured to have subsurface optical elements configured to inhibit progression of myopia (of the eye 10) as described herein.

FIG. 2 illustrates transmission of light 26 to the retina 16 from a second object 28 disposed at a second location so as to be in the periphery of the field of view of the eye 10. The eye 10 has an optical axis 30 that extends from the center of the fovea 18 through the center of the pupil 32. Due to the peripheral location of the second object 28 with respect to the optical axis 30, the light 26 passes through a peripheral portion of the contact lens 24 and is incident on the perifovea 22 portion of the retina 16. The light 26 also passes through a peripheral portion of the cornea of the eye 10 and through a peripheral portion of the lens of the eye 10. If the lens of the eye 10 is replaced by an intraocular lens, light 26 would pass through a peripheral portion of the intraocular lens.

FIG. 3 illustrates transmission of light 34 from a third object 36 disposed at a third location so as to be in the periphery of a field of view to the retina 16. Due to the peripheral location of the third object 36 with respect to the optical axis 30, the light 34 passes through both a central portion and a peripheral portion of the contact lens 24 and is incident on the perafovea 20 portion of the retina. Likewise, the light 34 also passes through a central portion and a peripheral portion of the cornea of the eye 10, and through a central portion and a peripheral portion of the cornea of the eye 10. If the lens of the eye 10 is replaced by an intraocular lens, light 34 would pass through a central portion and a peripheral portion of the intraocular lens.

Visual acuity for objects seen via the peripheral retina (i.e., the perafovea 20 and/or the perifovea 22) is less than for objects seen via the fovea 18. As illustrated in FIG. 3, the light incident on the peripheral retina can be a combination of light that passes through a peripheral portion and a central portion of the contact lens 24, a peripheral portion and a central portion of the cornea of the eye 10, and a peripheral portion and a central portion of the lens of the eye 10 or a peripheral portion and a central portion of an intraocular lens that replaces the lens of the eye 10. The eye 10 may also focus light better on the fovea 18 than on the peripheral retina 20, 22, thereby potentially further decreasing the level of visual acuity for objects seen via the peripheral retina 20, 22 relative to an object seen via the fovea 18.

Myopia progression has been associated with excessive eye growth, which can increase the distance between the fovea 18 and lens 34 of the eye 10. The increasing distance between the fovea 18 and the lens 34 results in the image being focused further forward of the fovea 18, thereby increasing myopia.

Studies have suggested that eye growth is influenced by light incident upon the peripheral retina. For example, one study, Smith, Earl L., et al. "Peripheral vision can influence eye growth and refractive development in infant monkeys" *Investigative ophthalmology & visual science* 46.11 (2005): 3965-3972, shows that eye growth in infant monkeys with no fovea (i.e., only the peripheral retina) is influenced by the optics of the eye with respect to the peripheral retina. As another example, in another study, Hiraoka, Takahiro, et al. "Relationship between higher-order wavefront aberrations and natural progression of myopia in schoolchildren" *Scientific reports* 7.1 (2017): 7876, 64 children were studied over 2 years. Of the 64 children studied, those who naturally had higher order aberrations (which provide a longer depth of focus) had less myopic progression over the 2 years.

Figure 4:
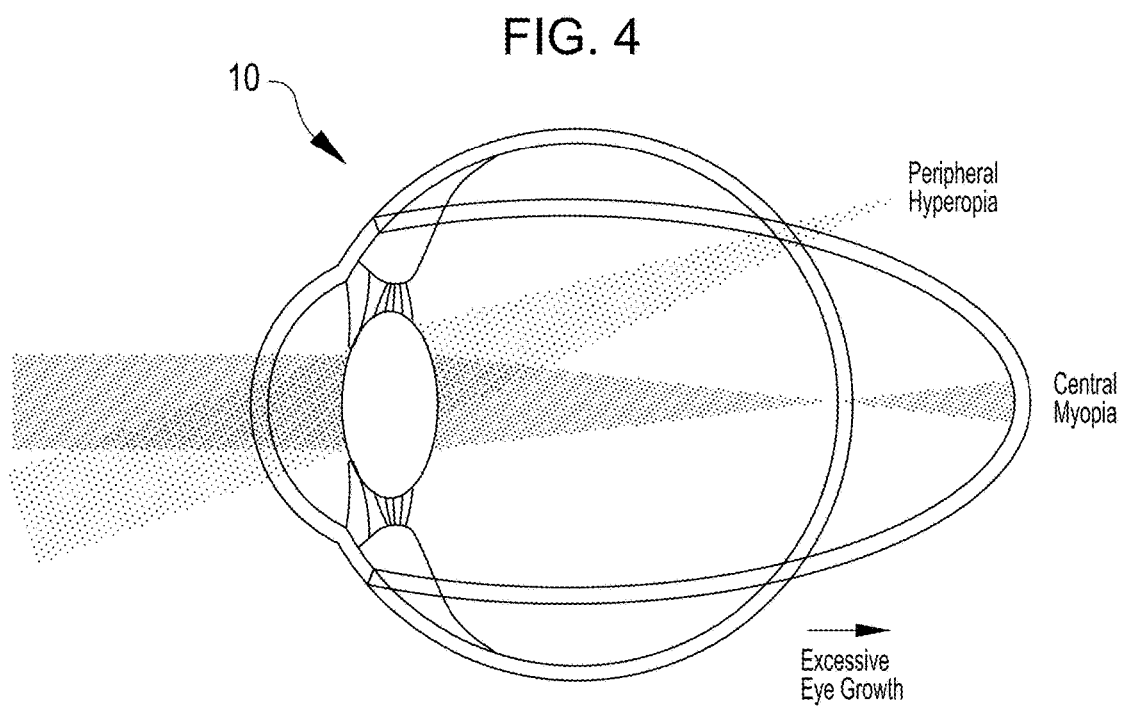
FIG. 4 illustrates coexistence of central myopia and peripheral hyperopia in an example eye.

The shape of the ocular globe can impact the nature of the light incident upon the peripheral retina. As illustrated in FIG. 4, for an ocular globe with a prolate shape, peripheral hyperopia can coexist with central myopia. Peripheral hyperopia has been identified as a potential stimulus for continued growth of the eye, which exacerbates central myopia.

Figure 5:
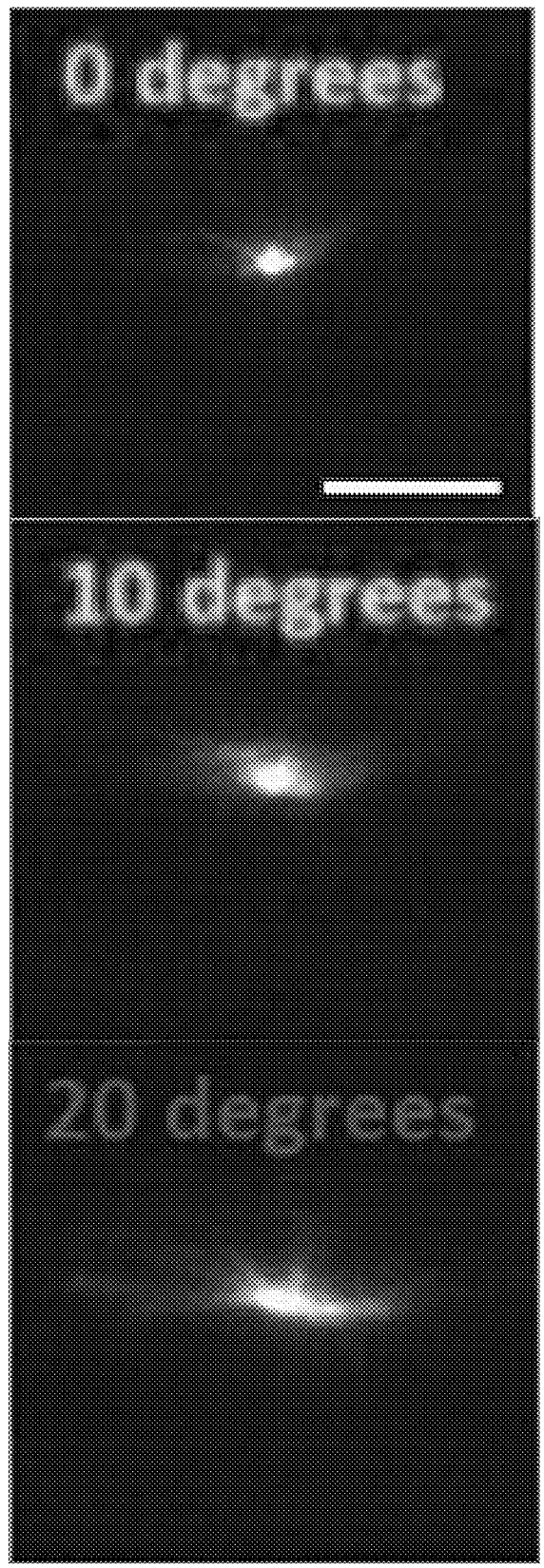
FIG. 5 illustrates point spread functions for one subject in the retina at zero degree, ten degree, and 20 degree eccentricities.
Figure 6:
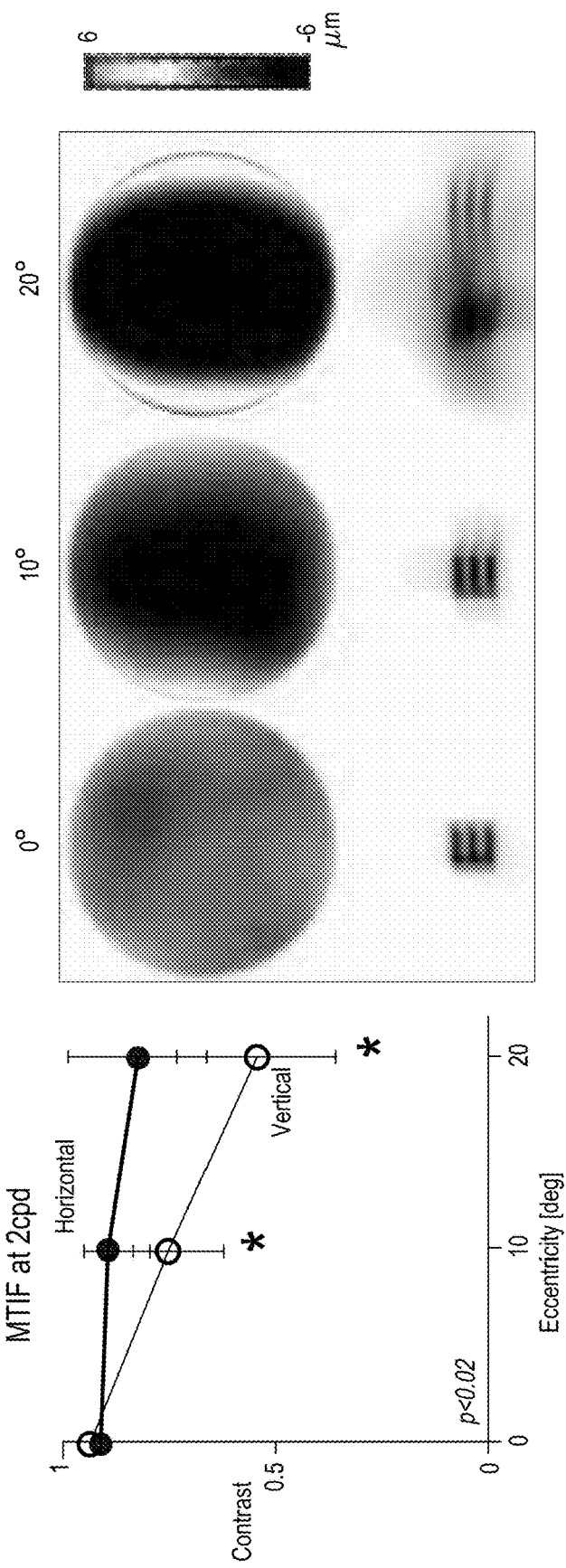
FIG. 6 illustrates wavefront aberrations in the retina of the subject of FIG. 4 at zero degree, ten degree, and 20 degree eccentricities.

It is believed by the inventor that anisotropy in peripheral vision may be a potential stimulus for continued growth of the eye, which exacerbates central myopia. Studies have shown that light incident on the peripheral retina often has some level of anisotropy and/or rotational asymmetry due to peripheral optical aberrations of the eye. For example, FIG. 5 illustrates point spread functions for one subject at zero degrees, ten degrees, and 20 degrees in the temporal retina. As can be seen, the point spread function at 20 degrees exhibits a substantial amount of anisotropy. FIG. 6 illustrates wavefront aberrations for the subject of FIG. 5 at zero degrees, ten degrees, and 20 degrees in the temporal retina. As can be seen, the wavefront aberrations for 20 degrees in the temporal retina exhibits a substantial amount of anisotropy.

Figure 7:
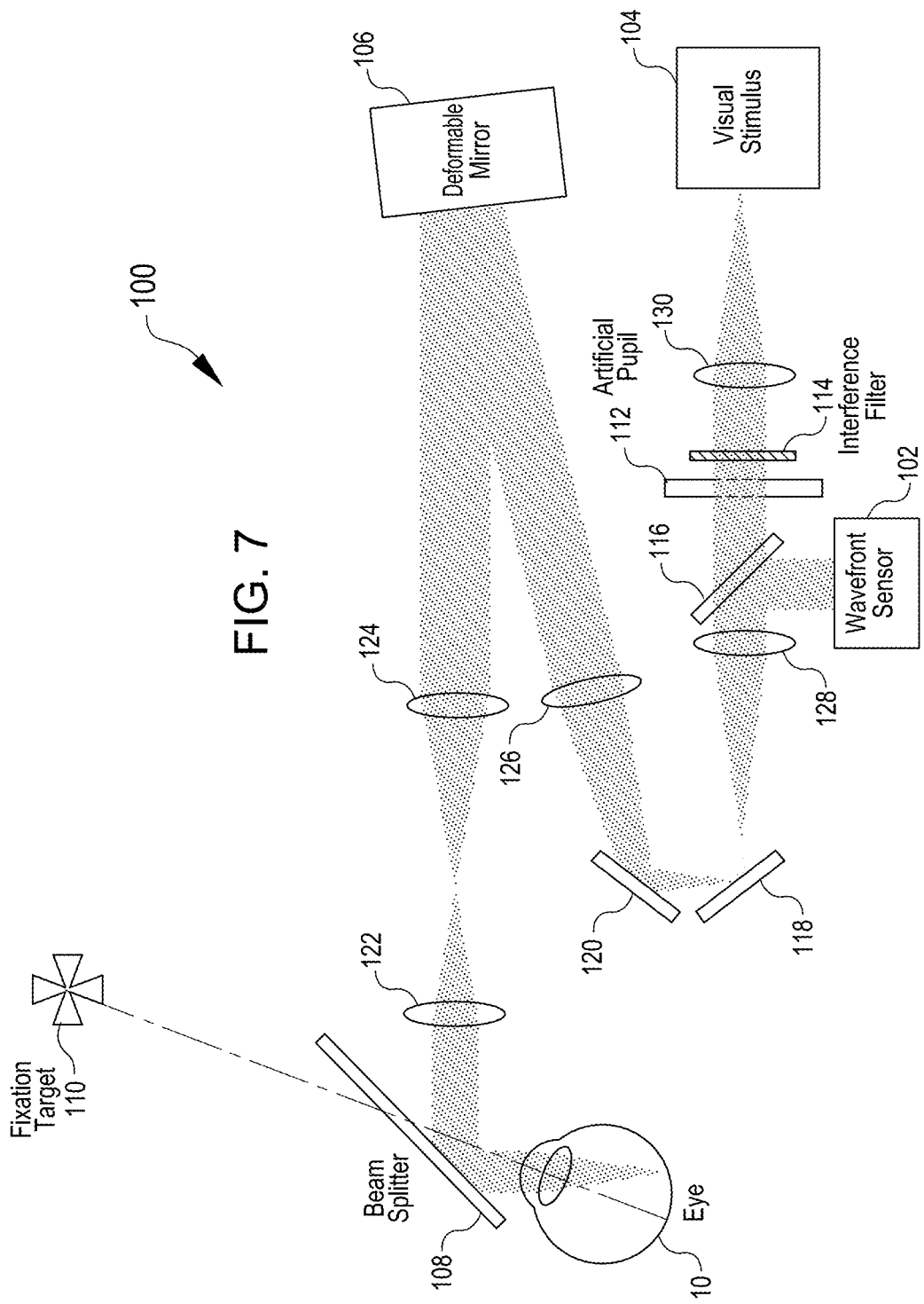
FIG. 7 is a simplified schematic diagram of a system for measuring off-axis and on-axis optical aberrations for selected locations in the retina, in accordance with embodiments.

FIG. 7 is a simplified schematic diagram illustrating a system 100 for measuring optical aberrations for selected locations of the retina, both off-axis and on-axis. The system 100 includes a wavefront sensor 102, a visual stimulus 104, a deformable mirror 106, a first beam splitter 108, a fixation target 110, an artificial pupil 112, an interference filter 114, a second beam splitter 116, mirrors 118, 120, and lenses 122, 124, 126, 128, and 130. Light emitted by the visual stimulus 104 is projected onto a targeted location on the retina 16 of the eye 10. The resulting light reflected from the targeted location on the retina is then projected by the eye 10 onto the beam splitter 108, which reflects to the projected light thereby directing the projected light onto the wavefront sensor 102. Any suitable existing wavefront sensor can be used as the wavefront sensor 102. For example, common wavefront sensors used today are based on the Schemer disk, the Shack Hartmann wavefront sensor, the Hartmann screen, and the Fizeau and Twymann-Green interferometers. The Shack-Hartmann wavefront measurement system is known in the art and is described in-part by U.S. Pat. Nos. 5,849,006; 6,261,220; 6,271,914 and 6,270,221. Such systems operate by illuminating a retina of the eye and measuring the reflected wavefront. In many embodiments, the fixation target 110 is selectively repositionable to provide for selective reorientation of the eye 10 to direct the light from the visual stimulus to selected locations in the fovea 18, the perafovea 20, and/or the perifovea 22, for measurement of optical aberrations associated with each selected locations of the retina via the wavefront sensor 102. The fixation target 110 can also be varied to reflect different viewing distances between the eye 10 and the fixation target 110 so as to induce different accommodations of the eye 10 to enable measurement of associated optical aberrations of the eye 10 for any suitable range of accommodation of the eye 10. The deformable mirror 106 can be controlled to apply an optical correction (e.g., corresponding to a candidate optical correction) to enable assessment of the optical correction on an image formed in the peripheral retina.

FIG. 8A is a simplified schematic drawing showing one approach for defining regions of the retina 16. In FIG. 8A, the perafovea 20 is subdivided into the illustrated regions, which include the perafovea nasal 20N, the perafovea tempo 20T, the perafovea superior 20S, and the perafovea inferior 20I. The perifovea 22 is subdivided into the illustrated regions, which include the perifovea nasal 22N, the perifovea tempo 22T, the perifovea superior 22S, and the perifovea inferior 22I.

In many embodiments, different annular regions of an ophthalmic lens are configured to provide a respective refractive optical correction for an image formed on an associated region of the retina. An optical correction provided by a respective annular region of the contact lens can be formulated based on an optical correction provide by a central zone of the contact lens. As described herein, light incident on some regions of the peripheral retina may be a combination of light that passes through a central portion of an ophthalmic lens (e.g., glasses, contact lens, cornea, native lens, or intraocular lens) and light that passes through a peripheral portion of the ophthalmic lens.

Figure 8B:
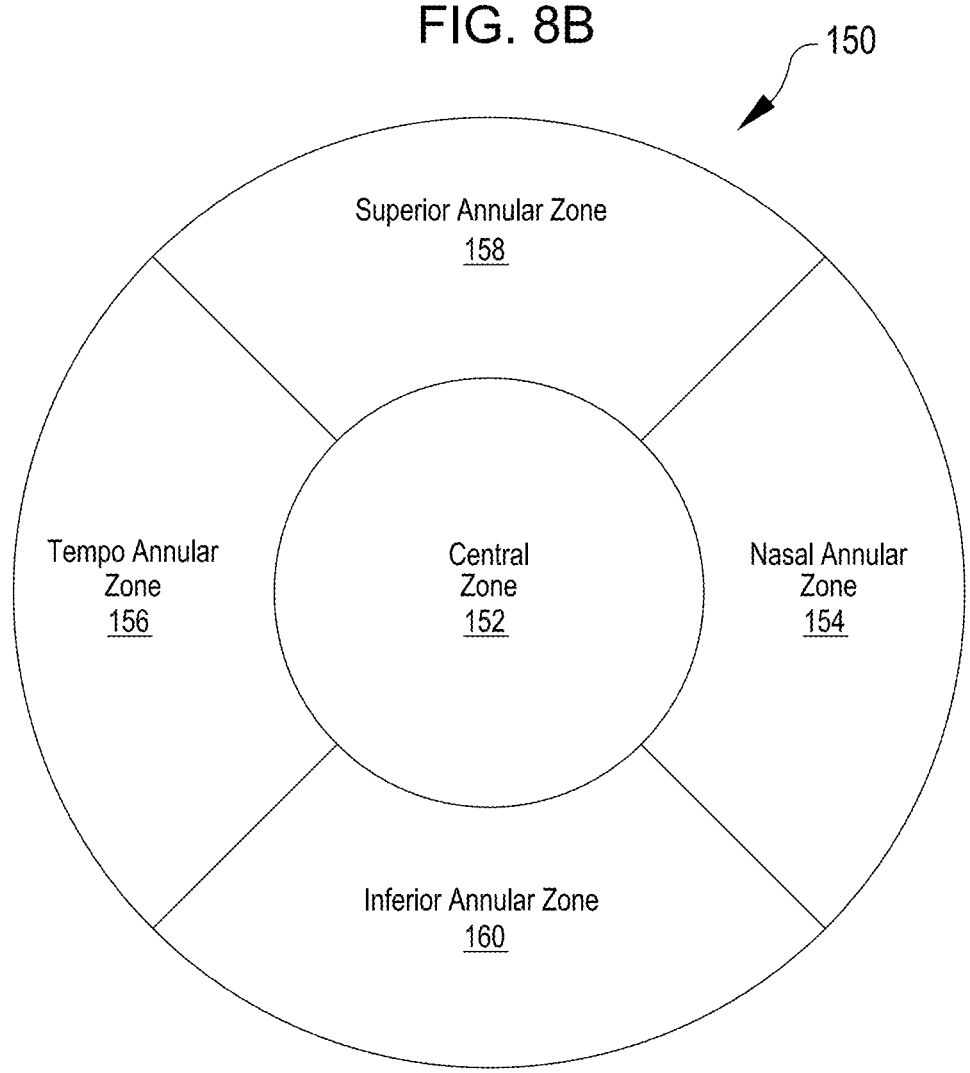
FIG. 8B illustrates an embodiment of an ophthalmic lens configured to inhibit progression of myopia and including four annular zones having subsurface optical elements.

FIG. 8B illustrates an embodiment of an ophthalmic lens 150 (e.g., glasses, contact lens, cornea, native lens, or intraocular lens) configured to inhibit progression of myopia. The ophthalmic lens 150 includes four annular zones having subsurface optical elements. The ophthalmic lens 150 has a central zone 152, a nasal annular zone 154, a tempo annular zone 156, a superior annular zone 158, and an inferior annular zone 160.

In many embodiments, the central zone 152 is configured to provide a suitable optical correction for the central vision of a subject. For example, the central zone 152 can have subsurface optical elements formed therein that provide a suitable optical correction for the central visions of the subject. As another example, the central zone 152 can have an external shape configured to provide a suitable optical correction for the central vision of the subject. As another example, the central zone 152 can have any suitable combination of subsurface optical elements formed therein and an external shape that combine to provide a suitable optical correction for the central vision of the subject.

The zones 152, 154, 156, 158, 160 can be configured to provide a respective optical correction to light incident on associated regions of the peripheral retina so as to inhibit progression of myopia. For example, the nasal annular zone 154 can be configured to provide an optical correction for light incident on the perifovea tempo region 22T so as to inhibit progression of myopia. The nasal annular zone 154 can be configured to provide an optical correction, in combination with an optical correction provided by the central zone 152, to provide a combined optical correction to light incident on the perafovea tempo region 20T and/or the perifovea tempo region 22T so as to inhibit progression of myopia. The tempo annular zone 156 can be configured to provide an optical correction for light incident on the perifovea nasal region 22N so as to inhibit progression of myopia. The tempo annular zone 156 can be configured to provide an optical correction, in combination with an optical correction provided by the central zone 152, to provide a combined optical correction to light incident on the perafovea nasal region 20N and/or the perifovea nasal region 22N so as to inhibit progression of myopia. The superior annular zone 158 can be configured to provide an optical correction for light incident on the perifovea inferior region 22I so as to inhibit progression of myopia. The superior annular zone 158 can be configured to provide an optical correction, in combination with an optical correction provided by the central zone 152, to provide a combined optical correction to light incident on the perafovea inferior region 20I and/or the perifovea inferior region 22I so as to inhibit progression of myopia. The inferior annular zone 160 can be configured to provide an optical correction for light incident on the perifovea superior region 22S so as to inhibit progression of myopia. The inferior annular zone 160 can be configured to provide an optical correction, in combination with an optical correction provided by the central zone 152, to provide a combined optical correction to light incident on the perafovea superior region 20S and/or the perifovea superior region 22S so as to inhibit progression of myopia.

Figure 9A:
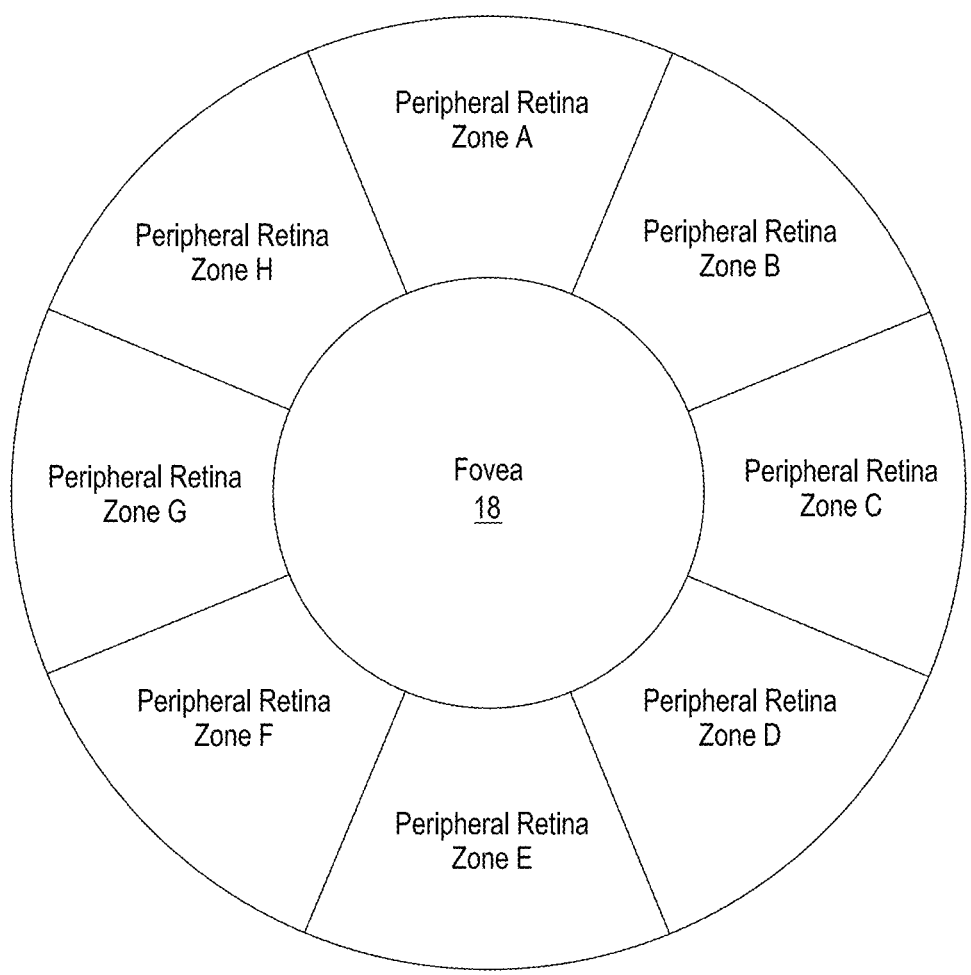
FIG. 9A is a simplified schematic drawing showing regions of a retina.
Figure 9B:
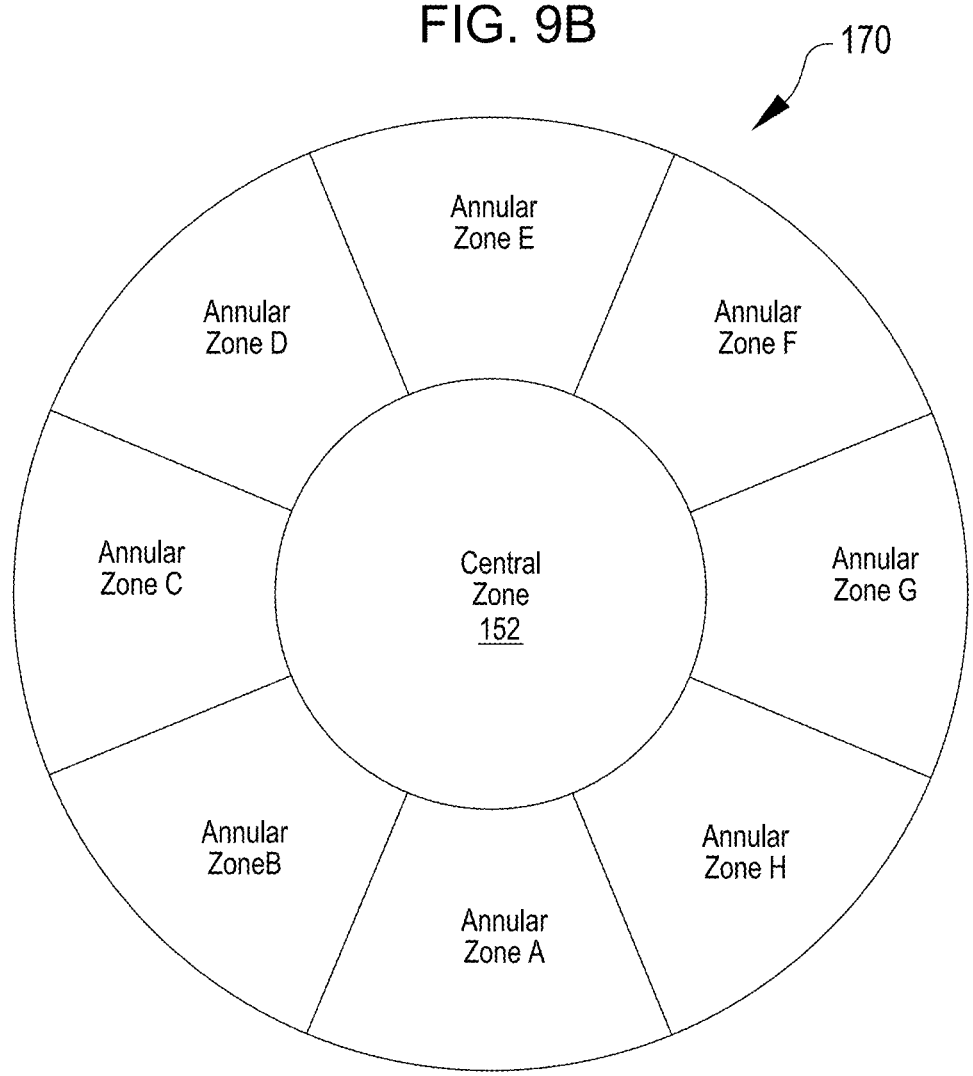
FIG. 9B illustrates an embodiment of an ophthalmic lens configured to inhibit progression of myopia and including eight annular zones having subsurface optical elements.

Other suitable approaches can be used for defining regions of the retina 16 and associated zones of an ophthalmic lens for providing optical corrections to inhibit progression of myopia. For example, FIG. 9A is a simplified schematic drawing showing another suitable approach for defining regions of the retina 16. In FIG. 9A, the retina 16 is subdivided into the fovea 18 and eight peripheral retinal zones (A through H). FIG. 9B illustrates an ophthalmic lens 170 with a central zone 152 and eight annular zones (A through H). Each of the eight annular zones illustrated in FIG. 9B can be configured to provide a respective optical correction to light incident on associated region of the peripheral retina illustrated in FIG. 9A so as to inhibit progression of myopia. For example, the annular zone (A) of the contact lens 170 can be configured to provide an optical correction for light incident on the peripheral retina zone (A) of FIG. 9A. The annular zone (A) can be configured to provide an optical correction, in combination with an optical correction provided by the central zone 152, to provide a combined optical correction to light incident on the peripheral retina zone (A) of FIG. 9A.

Figure 10A:
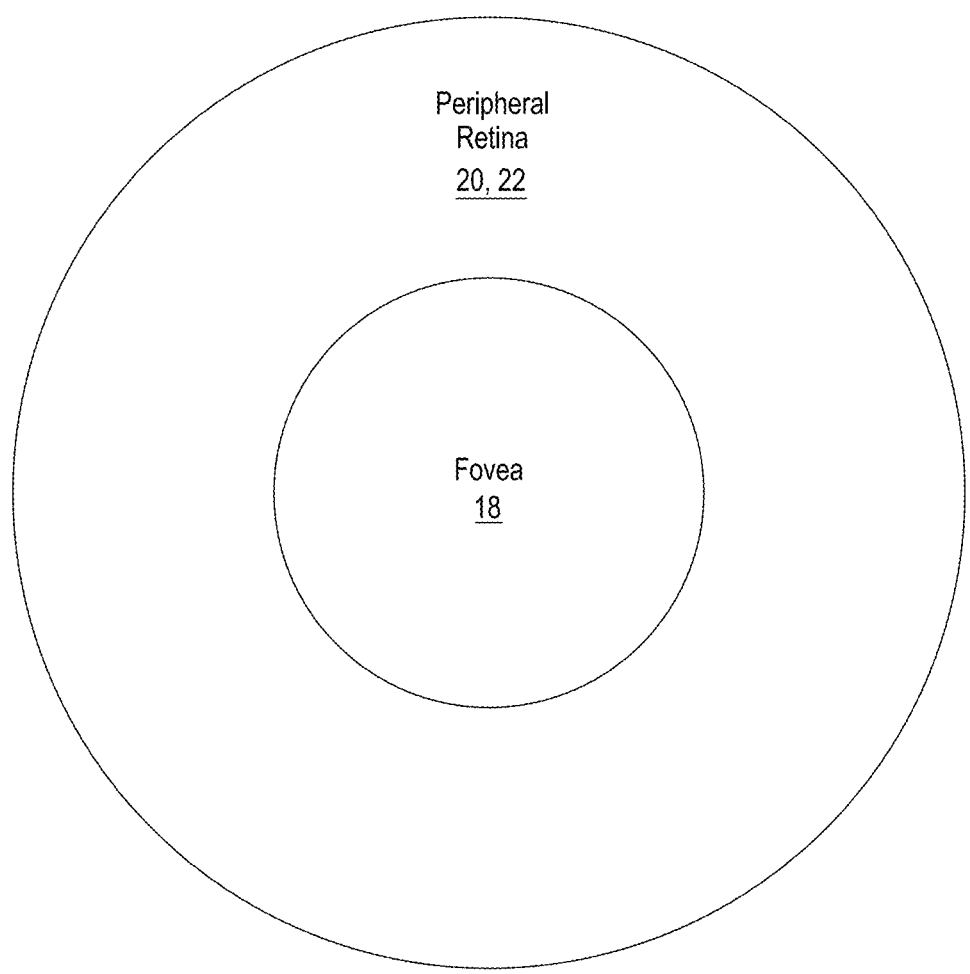
FIG. 10A is a simplified schematic drawing showing regions of a retina.
Figure 10B:
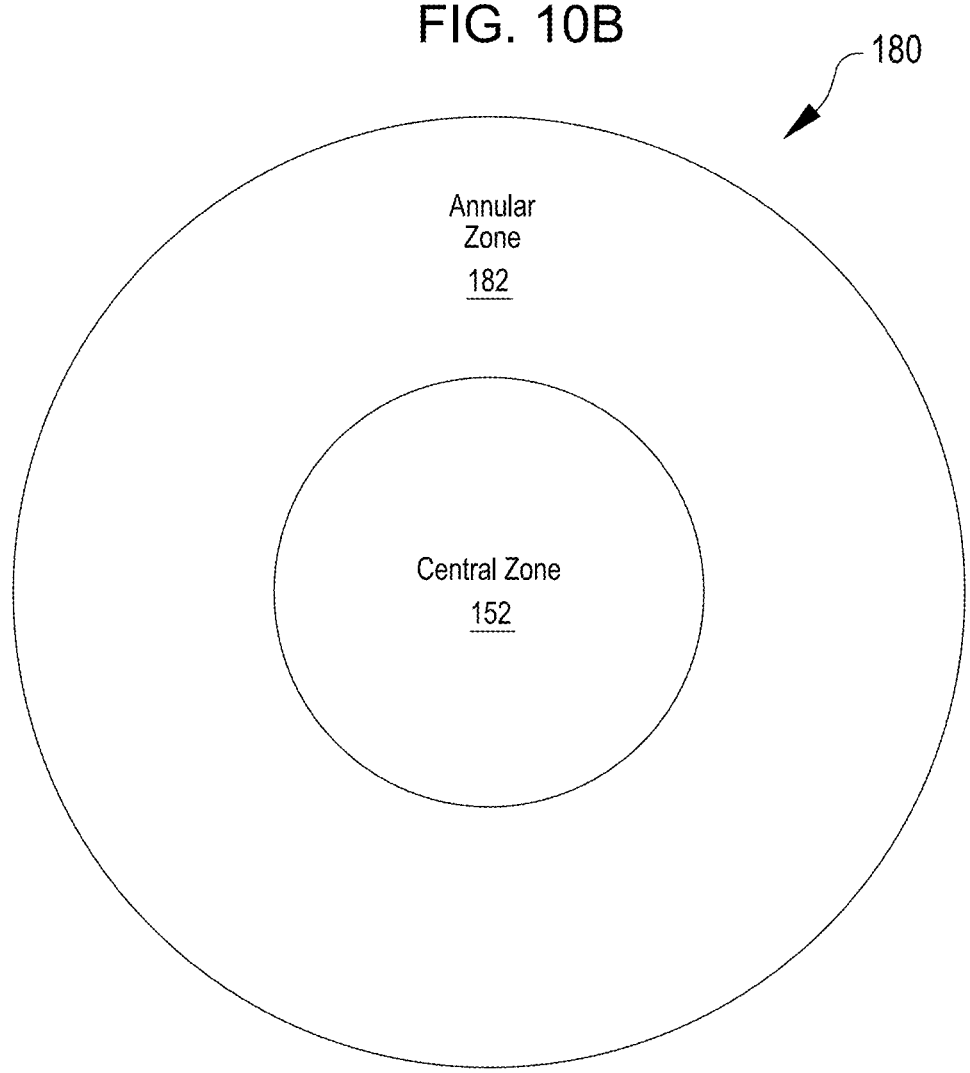
FIG. 10B illustrates an embodiment of an ophthalmic lens configured to inhibit progression of myopia and including an annular zone having subsurface optical elements.

FIG. 10A and FIG. 10B illustrate another approach that can be used for defining regions of the retina 16 and associated zones of an ophthalmic lens for providing optical corrections to inhibit progression of myopia. In FIG. 10A, the retina 16 is subdivided into the fovea 18 and the peripheral retina 20, 22. FIG. 10B illustrates an ophthalmic lens 180 with a central zone 152 and a single continuous annular zone 182. The annular zone 182 can be configured to provide a respective optical correction that to light incident on the peripheral retina 20, 22 so as to inhibit progression of myopia. The annular zone 182 can be configured to provide an optical correction, in combination with an optical correction provided by the central zone 152, to provide a combined optical correction to light incident on the peripheral retina 20, 22.

Figure 11:
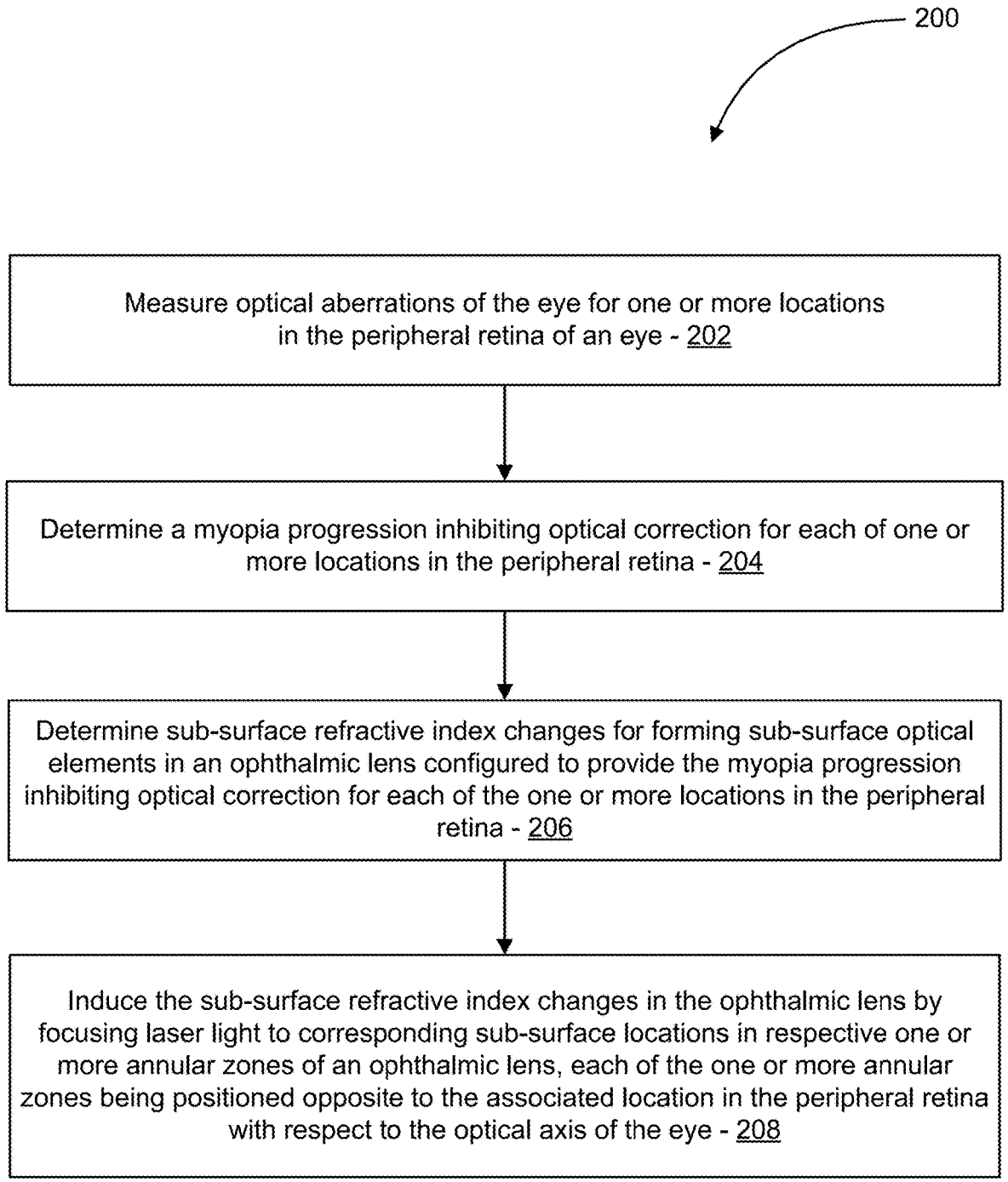
FIG. 11 is a simplified schematic illustration of a method of forming subsurface optical elements, within an ophthalmic lens, that are configured to inhibit progression of myopia, in accordance with embodiments.

FIG. 11 is a simplified schematic illustration of a method 200 of modifying an ophthalmic lens so as to configure the ophthalmic lens to inhibit progression of myopia in a subject associated with the ophthalmic lens, in accordance with embodiments. Any suitable optical corrections, approaches, and/or systems, including those described herein, can be used to practice the method 200.

In act 202, an optical aberrations of an eye of the subject are measured for each of one or more locations in the peripheral retina of the eye. For example, the system 100 can be used to measure optical aberrations for selected locations in the peripheral retina of the eye. In some embodiments, optical aberrations are measured for each of the selected locations for a suitable range of accommodation levels of the eye. In some embodiments, optical aberrations of the eye are measured for one or more locations in the fovea 18 of the eye.

In act 204, a myopia progression inhibiting optical correction is determined for each of one or more locations in the peripheral retina of the eye. In many embodiments, each of the myopia progression inhibiting optical correction determined is based on the optical aberrations measured in act 202. In some embodiments, the myopia progression inhibiting optical correction determined for each location in the peripheral retina corrects hyperopia at the location. In some embodiments, the myopia progression inhibiting optical correction determined for each location in the peripheral retina reduces optical anisotropy, which can be defined as the ratio of the horizontal divided by vertical area under a mean transfer function (MTF) curve between zero and 60 cycles/degree. In some embodiments, the myopia progression inhibiting optical correction determined for each location in the peripheral retina increases depth of focus at the respective location in the peripheral retina. In some embodiments, the myopia progression inhibiting optical correction determined for each location in the peripheral retina decreases depth of focus at the respective location in the peripheral retina.

In act 206, subsurface refractive index changes are determined for forming subsurface elements in an ophthalmic lens that are configured to provide the myopia progression inhibiting optical correction for each of the one or more locations in the peripheral retina. The subsurface refractive index changes can be formed using any suitable approaches, such as those described in U.S. Pat. Nos. 8,932,352; 9,939,558, and 10,806,567; the full disclosure of which are incorporated herein by reference. The subsurface optical elements can be configured to provide the entire myopia progression inhibiting optical correction for each of the one or more locations in the peripheral retina. Alternatively, the ophthalmic lens can have an external shape that provides a refractive correction that works in combination with the subsurface optical elements to provide the myopia progression inhibiting optical correction for each of the one or more locations in the peripheral retina.

In act 208, the subsurface refractive index changes are induced in the ophthalmic lens by focusing laser light to corresponding subsurface locations in respective one or more annular zones of the ophthalmic lens. Each of the one or more annular zones is positioned opposite to the associated location in the peripheral retina with respect to the optical axis of the eye.

Laser and Optical Systems for Forming Subsurface Optical Elements

Figure 12:
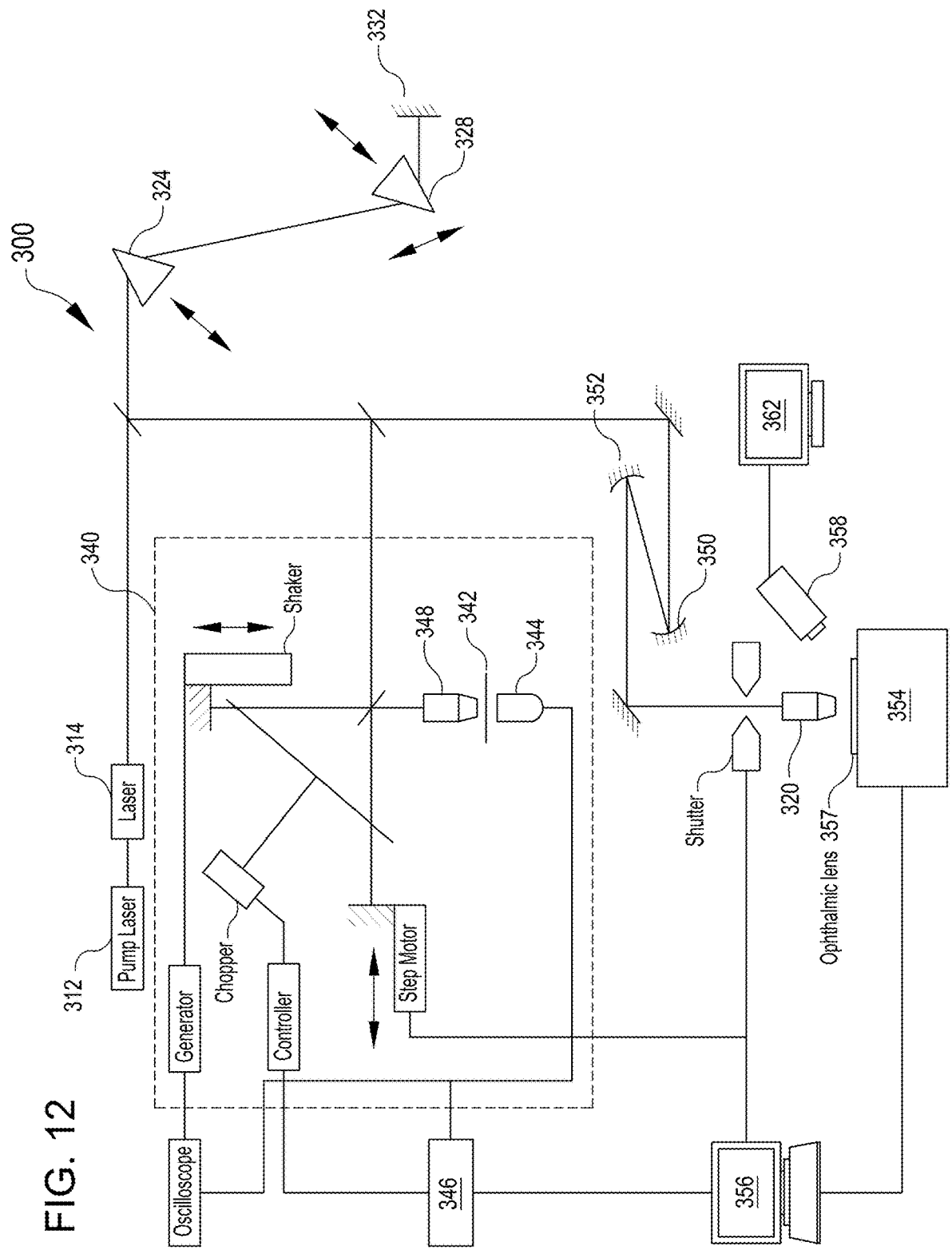
FIG. 12 is a schematic representation of a system that can be used to form subsurface optical elements, within an ophthalmic lens, that are configured to inhibit progression of myopia, in accordance with embodiments.

FIG. 12 is a schematic representation of the laser and optical system 300 that can be used to modify an ophthalmic lens to be configured to inhibit progression of myopia, in accordance with embodiments. The system 300 includes a laser source that includes a Kerr-lens mode-locked Ti:Sapphire laser 312 (Kapteyn-Mumane Labs, Boulder, Colo.) pumped by 4 W of a frequency-doubled Nd: $YVO_4$ laser 314. The laser generates pulses of 300 mW average power, 30 fs pulse width, and 93 MHz repetition rate at wavelength of 800 nm. Because there is a reflective power loss from the mirrors and prisms in the optical path, and in particular, from the power loss of the objective 320, the measured average laser power at the objective focus on the material is about 120 mW, which indicates the pulse energy for the femtosecond laser is about 1.3 nJ.

Due to the limited laser pulse energy at the objective focus, the pulse width can be preserved so that the pulse peak power is strong enough to exceed the nonlinear absorption threshold of the ophthalmic lens. Because a large amount of glass inside the focusing objective significantly increases the pulse width due to the positive dispersion inside of the glass, an extra-cavity, compensation scheme can be used to provide the negative dispersion that compensates for the positive dispersion introduced by the focusing objective. Two SF10 prisms 324 and 328 and one ending mirror 332 form a two-pass one-prism-pair configuration. A 37.5 cm separation distance between the prisms can be used to compensate the dispersion of the microscope objective and other optics within the optical path.

A collinear autocorrelator 340 using third-order harmonic generation is used to measure the pulse width at the objective focus. Both 2nd and 3rd harmonic generation have been used in autocorrelation measurements for low NA or high NA objectives. Third order surface harmonic generation (THG) autocorrelation was selected to characterize the pulse width at the focus of the high-numerical-aperture objectives because of its simplicity, high signal to noise ratio and Jack of material dispersion that second harmonic generation (SHG) crystals usually introduce. The THG signal is generated at the interface of air and an ordinary cover slip 342 (Corning No. 0211 Zinc Titania glass), and measured with a photomultiplier 344 and a lock-in amplifier 346. After using a set of different high-numerical-aperture objectives and carefully adjusting the separation distance between the two prisms and the amount of glass inserted, a transform-limited 27-fs duration pulse was selected. The pulse is focused by a 60×0.70NA Olympus LUCPlanFLN long-working-distance objective 348.

Because the laser beam will spatially diverge after it comes out of the laser cavity, a concave mirror pair 350 and 352 is added into the optical path in order to adjust the dimension of the laser beam so that the laser beam can optimally fills the objective aperture. A 3D 100 nm resolution DC servo motor stage 354 (Newport VP-25XA linear stage) and a 2D 0.7 nm resolution piezo nanopositioning stage (P1 P-622.2CD piezo stage) are controlled and programmed by a computer 356 as a scanning platform to support and locate an ophthalmic lens 357. The servo stages have a DC servo-motor so they can move smoothly between adjacent steps. An optical shutter controlled by the computer with 1 ms time resolution is installed in the system to precisely control the laser exposure time. With customized computer programs, the optical shutter could be operated with the scanning stages to form the subsurface optical elements in the ophthalmic lens 357 with different scanning speed at different position and depth and different laser exposure time. In addition, a CCD camera 358 along with a monitor 362 is used beside the objective 320 to monitor the process in real time. The system 300 can be used to modify the refractive index of an ophthalmic lens to form subsurface optical elements that provide a myopia progression inhibiting optical correction for each of one or more locations in the peripheral retina.

Figure 13:
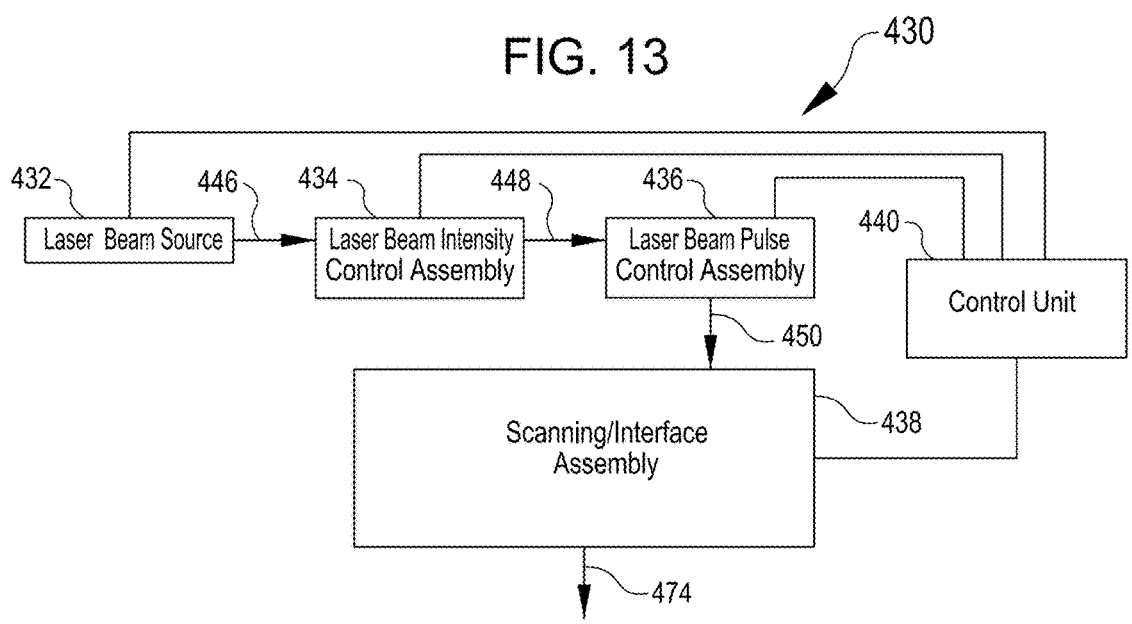
FIG. 13 and FIG. 14 schematically illustrate another system that can be used to form subsurface optical elements, within an ophthalmic lens, that are configured to inhibit progression of myopia, in accordance with embodiments.

FIG. 13 is a simplified schematic illustration of another system 430 for forming one or more subsurface optical structures within an ophthalmic lens 410, in accordance with embodiments. The system 430 includes a laser beam source 432, a laser beam intensity control assembly 434, a laser beam pulse control assembly 436, a scanning/interface assembly 438, and a control unit 440.

The laser beam source 432 generates and emits a laser beam 446 having a suitable wavelength for inducing refractive index changes in target sub-volumes of the ophthalmic lens 410. In examples described herein, the laser beam 446 has a 1035 nm wavelength. The laser beam 446, however, can have any suitable wavelength (e.g., in a range from 400 to 1100 nm) effective in inducing refractive index changes in the target sub-volumes of the ophthalmic lens 410.

The laser beam intensity control assembly 434 is controllable to selectively vary intensity of the laser beam 446 to produce a selected intensity laser beam 48 output to the laser beam pulse control assembly 436. The laser beam intensity control assembly 434 can have any suitable configuration, including any suitable existing configuration, to control the intensity of the resulting laser beam 448.

The laser beam pulse control assembly 436 is controllable to generate collimated laser beam pulses 450 having suitable duration, intensity, size, and spatial profile for inducing refractive index changes in the target sub-volumes of the ophthalmic lens 410. The laser beam pulse control assembly 436 can have any suitable configuration, including any suitable existing configuration, to control the duration of the resulting laser beam pulses 450.

The scanning/interface assembly 438 is controllable to selectively scan the laser beam pulses 450 to produce XYZ scanned laser pulses 474. The scanning/interface assembly 438 can have any suitable configuration, including any suitable existing configuration (for example, the configuration illustrated in FIG. 14) to produce the XYZ scanned laser pulses 474. The scanning/interface assembly 438 receives the laser beam pulses 450 and outputs the XYZ scanned laser pulses 474 in a manner that minimizes vignetting. The scanning/interface assembly 438 can be controlled to selectively scan each of the laser beam pulses 450 to generate XYZ scanned laser pulses 474 focused onto targeted sub-volumes of the ophthalmic lens 410 to induce the respective refractive index changes in targeted sub-volumes so as to form the one or more subsurface optical structures within an ophthalmic lens 410. In many embodiments, the scanning/interface assembly 438 is configured to restrain the position of the ophthalmic lens 410 to a suitable degree to suitably control the location of the targeted sub-volumes of the ophthalmic lens 410 relative to the scanning/interface assembly 438. In many embodiments, such as the embodiment illustrated in FIG. 14, the scanning/interface assembly 438 includes a motorized Z-stage that is controlled to selectively control the depth within the ophthalmic lens 410 to which each of the XYZ scanned laser pulses 474 is focused.

The control unit 440 is operatively coupled with each of the laser beam source 432, the laser beam intensity control assembly 434, the laser beam pulse control assembly 436, and the scanning/interface assembly 438. The control unit 440 provides coordinated control of each of the laser beam source 432, the laser beam intensity control assembly 434, the laser beam pulse control assembly 436, and the scanning/interface assembly 438 so that each of the XYZ scanned laser pulses 474 have a selected intensity and duration, and are focused onto a respective selected sub-volume of the ophthalmic lens 410 to form the one or more subsurface optical structures within an ophthalmic lens 410. The control unit 440 can have any suitable configuration. For example, in some embodiments, the control unit 440 comprises one or more processors and a tangible memory device storing instructions executable by the one or more processors to cause the control unit 440 to control and coordinate operation of the of the laser beam source 432, the laser beam intensity control assembly 434, the laser beam pulse control assembly 436, and the scanning/interface assembly 438 to produce the XYZ scanned laser pulses 474, each of which is synchronized with the spatial position of the sub-volume optical structure.

Figure 14:
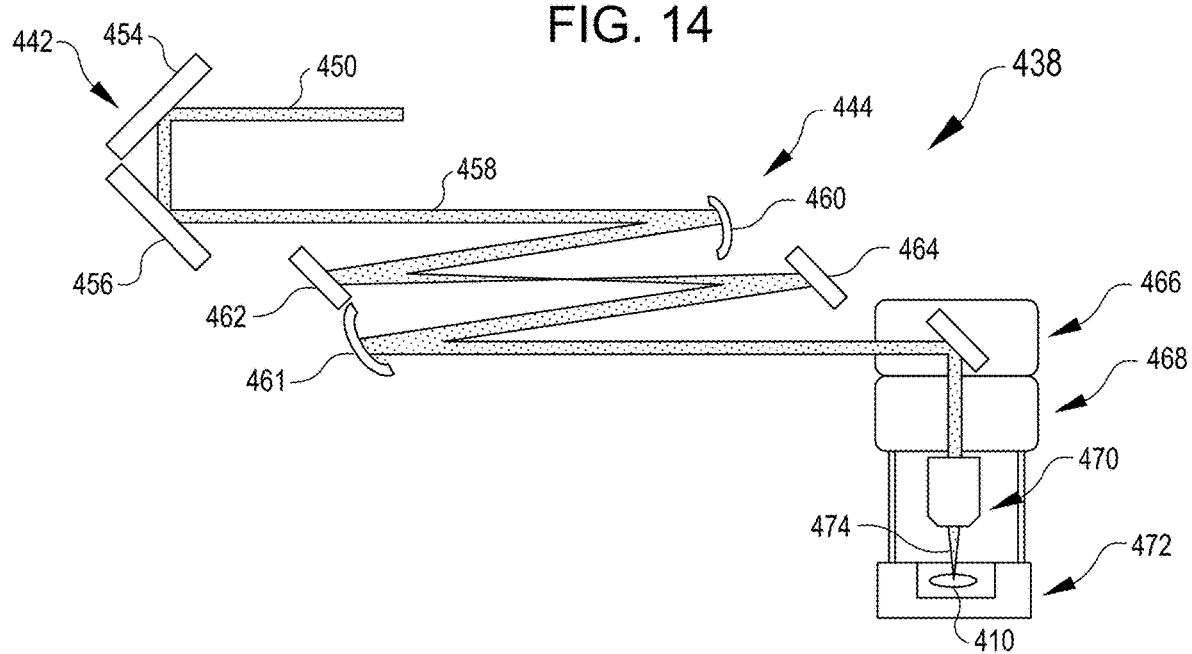

FIG. 14 is a simplified schematic illustration of an embodiment of the scanning/interface assembly 438. In the illustrated embodiment, the scanning/interface assembly 438 includes an XY galvo scanning unit 442, a relay optical assembly 444, a Z stage 466, an XY stage 468, a focusing objective lens 470, and a patient interface/ophthalmic lens holder 472. The XY galvo scanning unit 438 includes XY galvo scan mirrors 454, 456. The relay optical assembly 440 includes concave mirrors 460, 461 and plane mirrors 462, 464.

The XY galvo scanning unit 442 receives the laser pulses 450 (e.g., 1035 nm wavelength collimated laser pulses) from the laser beam pulse control assembly 436. In the illustrated embodiment, the XY galvo scanning unit 442 includes a motorized X-direction scan mirror 454 and a motorized Y-direction scan mirror 456. The X-direction scan mirror 454 is controlled to selectively vary orientation of the X-direction scan mirror 454 to vary direction/position of XY scanned laser pulses 458 in an X-direction transverse to direction of propagation of the XY scanned laser pulses 458. The Y-direction scan mirror 456 is controlled to selectively vary orientation of the Y-direction scan mirror 456 to vary direction/position of the XY scanned laser pulses 458 in an Y-direction transverse to direction of propagation of the XY scanned laser pulses 458. In many embodiments, the Y-direction is substantially perpendicular to the X-direction.

The relay optical assembly 440 receives the XY scanned laser pulses 458 from the XY galvo scanning unit 442 and transfers the XY scanned laser pulses 458 to Z stage 466 in a manner that minimizes vignetting. Concave mirror 460 reflects each of the XY scanned laser pulse 458 to produce a converging laser pulses incident on plane mirror 462. Plane mirror 462 reflects the converging XY scanned laser pulse 458 towards plane mirror 464. Between the plane mirror 462 and the plane mirror 464, the XY scanned laser pulse 458 transitions from being convergent to being divergent. The divergent laser pulse 458 is reflected by plane mirror 464 onto concave mirror 461. Concave mirror 461 reflects the laser pulse 458 to produce a collimated laser pulse that is directed to the Z stage 466.

The Z stage 466 receives the XY scanned laser pulses 458 from the relay optical assembly 442. In the illustrated embodiment, the Z stage 466 and the XY stage 468 are coupled to the focusing objective lens 470 and controlled to selectively position the focusing objective lens 470 relative to the ophthalmic lens 410 for each of the XY scanned laser pulses 474 so as to focus the XYZ scanned laser pulse 474 onto a respective targeted sub-volume of the ophthalmic lens 410. The Z stage 466 is controlled to selectively control the depth within the ophthalmic lens 410 to which the laser pulse is focused (i.e., the depth of the sub-surface volume of the ophthalmic lens 410 on which the laser pulse is focused to induce a change in refractive index of the targeted sub-surface volume). The XY stage 468 is controlled in conjunction with control of the XY galvo scanning unit 442 so that the focusing objective lens 470 is suitably positioned for the respective transverse position of each of the XY scanned laser pulses 458 received by the Z stage 466. The focusing objective lens 470 converges the laser pulse onto the targeted sub-surface volume of the lens 410. The patient interface/ophthalmic lens holder 472 restrains the ophthalmic lens 410 in a fixed position to support scanning of the laser pulses 474 by the scanning/interface assembly 438 to form the subsurface optical structures within the ophthalmic lens 410.

Defining Subsurface Optical Elements for a Specified Optical Correction

FIG. 15 through FIG. 22 illustrate a process that can be used to define subsurface optical elements for a specified optical correction. While an optical correction for inhibiting progression of myopia in a subject using the approaches described herein may be a combination of any suitable number of low-order optical corrections and/or any suitable number of high-order optical corrections, a single, simple 2 diopter optical correction is illustrated. The same process, however, can be used to define subsurface optical elements for an ophthalmic lens to configure the ophthalmic lens to provide an optical correction (such any of the myopia inhibiting optical corrections described herein) that inhibits myopia progression.

Figure 15:
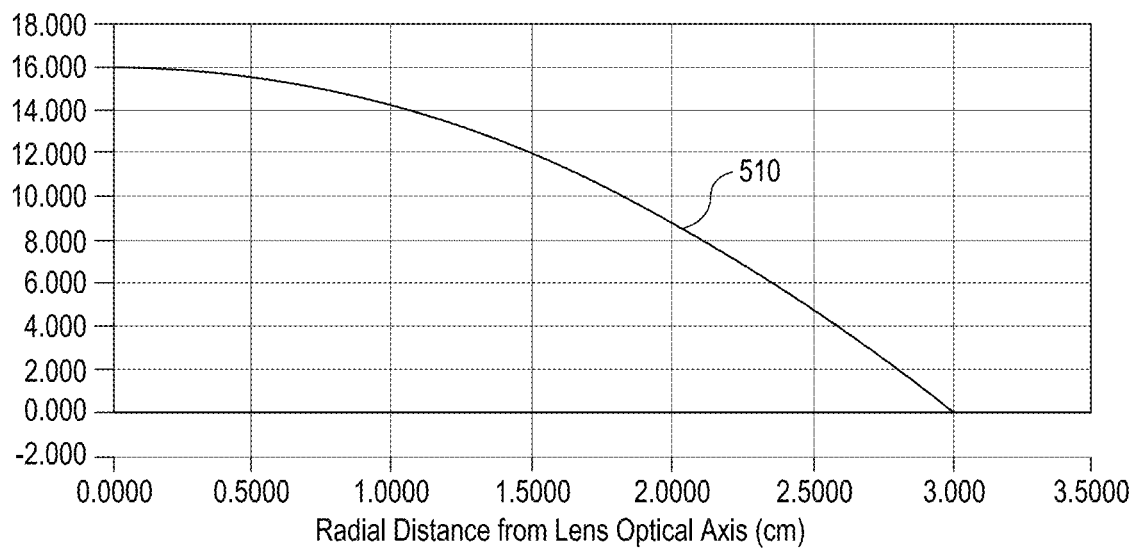
FIG. 15 illustrates an example radial distribution of an optical correction for implementation via subsurface optical elements formed within an ophthalmic lens, in accordance with embodiments.

FIG. 15 shows a radial variation in units of optical waves of a 2.0 diopter refractive index distribution 510, in accordance with embodiments. The optical waves in this curve correspond to a design wavelength of 562.5 nm. In the illustrated embodiment, the 2.0 diopter refractive index distribution 510 decreases from a maximum of 16.0 waves at the optical axis of an ophthalmic lens down to 0.0 waves at 3.0 cm from the optical axis.

Figure 16:
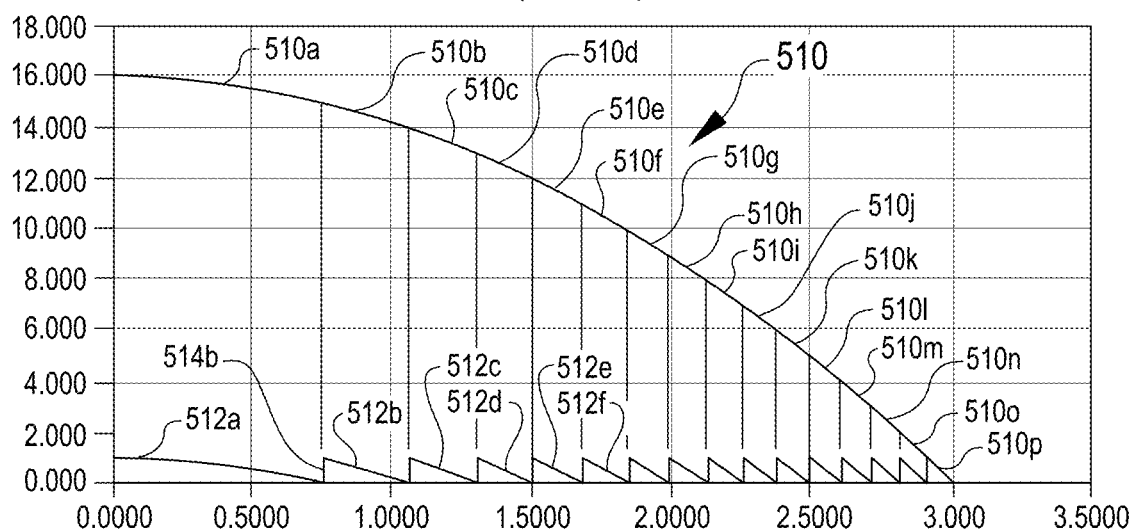
FIG. 16 illustrates a 1-wave phase wrapped distribution for the example optical correction of FIG. 15.

FIG. 16 shows a 1.0 wave phase-wrapped refractive index distribution 512 corresponding to the 2.0 diopter refractive index distribution 510. Each segment of the 1.0 wave phase-wrapped refractive index distribution 512 includes a sloped segment (512a through 512p). Each of all the segments, except the center segment, of the 1.0 wave phase-wrapped refractive index distribution 512 includes a phase discontinuity (514b through 514p) with a height equal to 1.0 wave. Each of the sloped segments (512a through 512p) is shaped to match the corresponding overlying segment (510a through 510p) of the 2.0 diopter refractive index distribution 510. For example, sloped segment 512p matches overlying segment 510p; sloped segment 512o is equal to overlying segment 510o minus 1.0 wave; sloped segment 512n is equal to overlying segment 510n minus 2.0 waves; sloped segment 512a is equal to overlying segment 510a minus 15.0 waves. Each sloped segment corresponds to a Fresnel zone.

The 1.0 wave height of each of the phase discontinuities (514b through 514p) in the distribution 512 results in diffraction at the design wavelength that provides the same 2.0 diopter refractive correction as the 2.0 diopter refractive distribution 510 while limiting maximum phase equal to 1.0 wave.

The 1.0 wave phase-wrapped refractive index distribution 512 requires substantially lower total laser pulse energy to induce in comparison to the 2.0 diopter refractive index distribution 510. The area under the 1.0 wave phase-wrapped refractive index distribution 512 is only about 5.2 percent of the area under the 2.0 diopter refractive index distribution 510.

Figure 17:
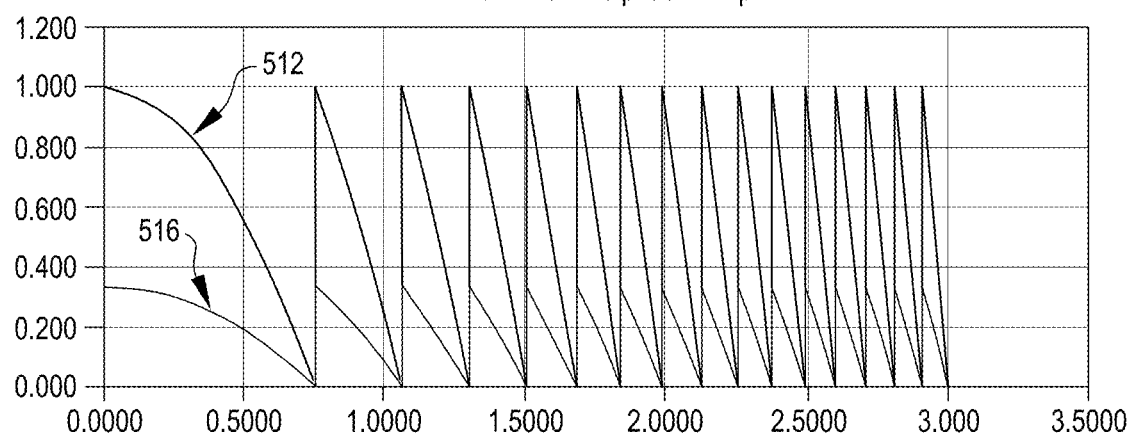
FIG. 17 illustrates a ⅓ wave ratio of the 1-wave phase wrapped distribution of FIG. 16.

FIG. 17 shows the 1.0 wave phase-wrapped refractive index distribution 512 and an example scaled phase-wrapped refractive index distribution (for a selected maximum wave value) corresponding to the 1.0 wave phase-wrapped refractive index distribution 512. In the illustrated embodiment, the example scaled phase-wrapped refractive index distribution has a maximum wave value of ⅓ wave. Similar scaled phase-wrapped refractive index distributions can be generated for other suitable maximum wave values less than 1.0 wave (e.g., ¾ wave, ⅝ wave, ½ wave, ¼ wave, ⅙ wave). The ⅓ optical wave maximum scaled phase-wrapped refractive index distribution 516 is equal to ⅓ of the 1.0 wave phase-wrapped refractive index distribution 512. The ⅓ optical wave maximum scaled phase-wrapped refractive index distribution 516 is one substitute for the 1.0 wave phase-wrapped refractive index distribution 512 and utilizes a maximum refractive index value that provides a corresponding maximum ⅓ wave optical correction.

The ⅓ optical wave maximum scaled phase-wrapped refractive index distribution 516 requires less total laser pulse energy to induce in comparison with the 1.0 wave phase-wrapped refractive index distribution 512. The area under the ⅓ optical wave maximum scaled phase-wrapped refractive index distribution 516 is ⅓ of the area under the 1.0 wave phase-wrapped refractive index distribution 512. Three stacked layers of the ⅓ wave distribution 516 can be used to produce the same optical correction as the 1.0 wave distribution 512.

Figure 18:
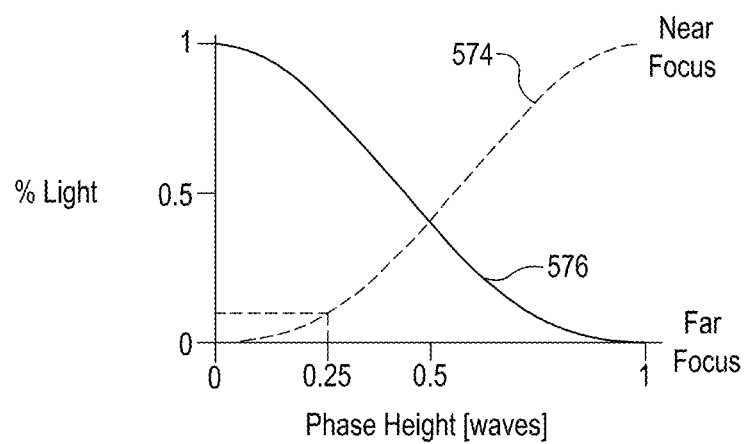
FIG. 18 graphically illustrates diffraction efficiency for near focus and far focus versus phase height.

FIG. 18 graphically illustrates diffraction efficiency for near focus 574 and far focus 576 versus phase change height. For phase change heights less than 0.25 waves, the diffraction efficiency for near focus is only about 10 percent. Near focus diffraction efficiency of substantially greater than 10 percent, however, is desirable to limit the number of layers of the subsurface optical structures that are stacked to generate a desired overall optical correction. Greater phase change heights can be achieved by inducing greater refractive index changes in the targeted sub-volumes of the ophthalmic lens 410. Greater refractive index changes in the targeted sub-volumes of the ophthalmic lens 410 can be induced by increasing energy of the laser pulses focused onto the targeted sub-volumes of the ophthalmic lens 410.

Figure 19:
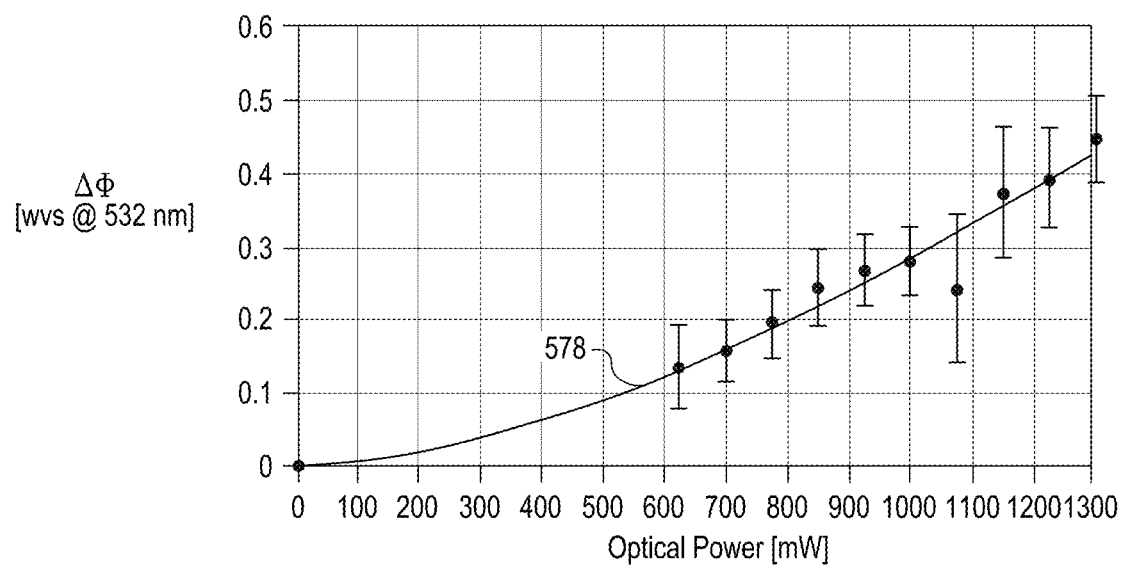
FIG. 19 graphically illustrates an example calibration curve for resulting phase change height as a function of laser pulse train optical power.

FIG. 19 graphically illustrates an example calibration curve 578 for resulting phase change height as a function of laser pulse optical power. The calibration curve 578 shows correspondence between resulting phase change height as a function of laser average power for a corresponding laser pulse duration, laser pulse wavelength, laser pulse repetition rate, numerical aperture, material of the ophthalmic lens 410, depth of the targeted sub-volume, spacing between the targeted sub-volumes, scanning speed, and line spacing. The calibration curve 578 shows that increasing laser pulse energy results in increased phase change height.

Laser pulse energy, however, may be limited to avoid propagation of damage induced caused by laser pulse energy and/or heat accumulation with the ophthalmic lens 410, or even between the layers of the subsurface optical elements. In many instances, there is no observed damage during formation of the first two layers of subsurface optical elements and damage starts to occur during formation of the third layer of subsurface optical elements. To avoid such damage, the subsurface optical elements can be formed using laser pulse energy below a pulse energy threshold of the material of the ophthalmic lens 410. Using lower pulse energy, however, increases the number of layers of the subsurface optical elements required to provide the desired amount of resulting phase change height, thereby adding to the time required to form the total number of subsurface optical elements 412 employed.

Figure 20:
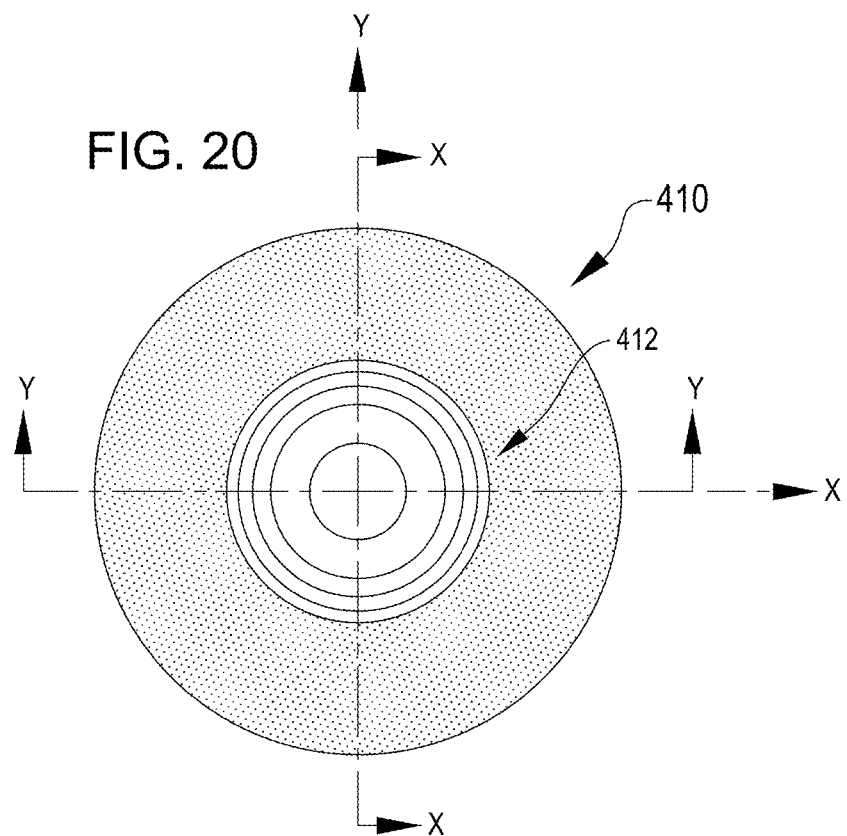
FIG. 20 is a plan view illustration of an ophthalmic lens that includes subsurface optical structures, in accordance with embodiments.

FIG. 20 is a plan view illustration of an ophthalmic lens 410 that includes one or more subsurface optical elements 412 with refractive index spatial variations, in accordance with embodiments. The one or more subsurface elements 12 described herein can be formed in any suitable type of ophthalmic lens including, but not limited to, intra-ocular lenses, contact lenses, corneas, spectacle lenses, and native lenses (e.g., a human native lens). The one or more subsurface optical elements 412 with refractive index spatial variations can be configured to provide a suitable refractive correction configured to inhibit progression of myopia as described herein. Additionally, the one or more subsurface optical elements 412 with refractive index spatial variations can be configured to provide a suitable refractive correction for each of many optical aberrations such as astigmatism, myopia, hyperopia, spherical aberrations, coma and trefoil, as well as any suitable combination thereof.

Figure 21:
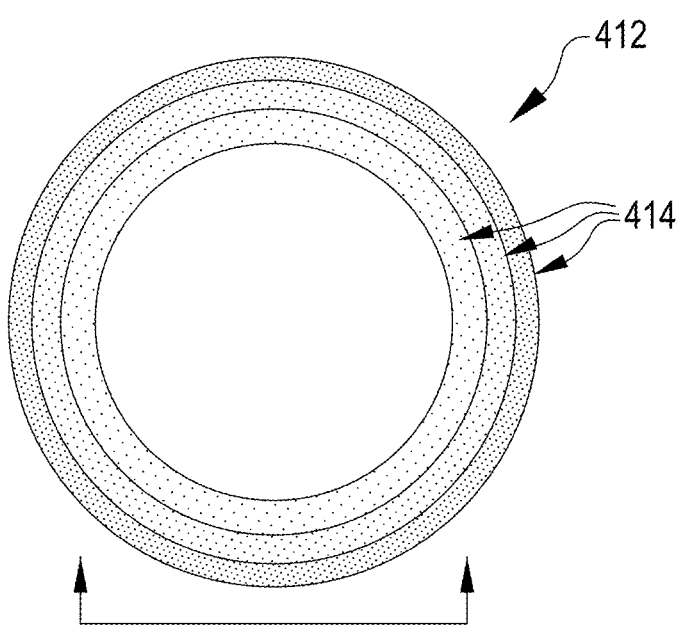
FIG. 21 is a plan view illustration of subsurface optical structures of the ophthalmic lens of FIG. 20.

FIG. 21 is a plan view illustration of one of the subsurface optical elements 412 of the ophthalmic lens 410. The illustrated subsurface optical elements 412 occupies a respective volume of the lens 410, which includes associated sub-volumes of the lens 410. In many embodiments, the volume occupied by one of the optical elements 412 includes first, second, and third portions 414. Each of the first, second, and third portions 414 can be formed by focusing suitable laser pulses inside the respective portion 414 so as to induce changes in refractive index in sub-volumes of the lens 410 that make up the respective portion 414 so that each portion 414 has a respective refractive index distribution.

In many embodiments, a refractive index distribution is defined for each portion 414 that forms the subsurface optical structures 412 so that the resulting subsurface optical structures 412 provide a desired optical correction. The refractive index distribution for each portion 414 can be used to determine parameters (e.g., laser pulse power (mW), laser pulse width (fs)) of laser pulses that are focused onto the respective portions 414 to induce the desired refractive index distributions in the portions 414.

While the portions 414 of the subsurface optical structures 412 have a circular shape in the illustrated embodiment, the portions 414 can have any suitable shape and distribution of refractive index variations. For example, a single portion 414 having an overlapping spiral shape can be employed. In general, one or more portions 414 having any suitable shapes can be distributed with intervening spaces so as to provide a desired optical correction for light incident on the subsurface optical structure 412.

Figure 22:
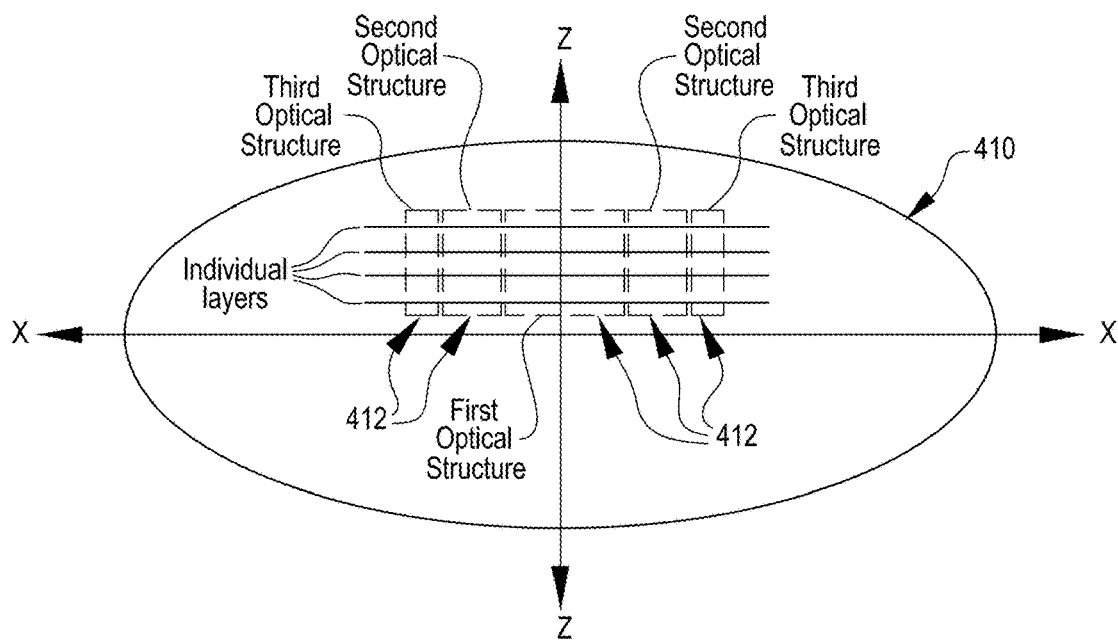
FIG. 22 is a side view illustration of the subsurface optical structures of the ophthalmic lens of FIG. 20.

FIG. 22 illustrates an embodiment in which the subsurface optical elements 412 are comprised of several stacked layers that are separated by intervening layer spaces. In the illustrated embodiment, the subsurface optical elements 412 have a spatial distribution of refractive index variations. FIG. 22 is a side view illustration of an example distribution of refractive index variations in the subsurface optical elements 412. In the illustrated embodiment, the subsurface optical elements 412 can be formed using a raster scanning approach in which each layer is sequentially formed starting with the bottom layer and working upward. For each layer, a raster scanning approach can sequentially scan the focal position of the laser pulses along planes of constant Z-dimension while varying the Y-dimension and the X-dimension so that the resulting layers have the flat cross-sectional shapes shown in FIG. 22, which shows a cross-sectional view of the ophthalmic lens 410. In the raster scanning approach, timing of the laser pulses can be controlled to direct each laser pulse onto a targeted sub-volume of the ophthalmic lens 410 and not direct laser pulses onto non-targeted sub-volumes of the ophthalmic lens 410, which include sub-volumes of the ophthalmic lens 10 that do not form any of the subsurface optical elements 412, such as the intervening spaces between the adjacent stacked layers that can form the subsurface optical elements 412.

In the illustrated embodiment, there are three annular subsurface optical elements 412 with distributions of refractive index spatial variations. Each of the illustrated subsurface optical elements 412 has a flat layer configuration and can be comprised of one or more layers. If the subsurface optical structures are comprised of more than one layer, the layers can be separated from each other by an intervening layer spacing. Each of the layers, however, can alternatively have any other suitable general shape including, but not limited to, any suitable non-planar or planar surface. In the illustrated embodiment, each of the subsurface optical elements 412 has a circular outer boundary. Each of the subsurface optical elements 412, however, can alternatively have any other suitable outer boundary shape. Each of the subsurface optical elements 412 can include two or more separate portions 14 with each covering a portion of the subsurface optical elements 412.

Figure 23A:
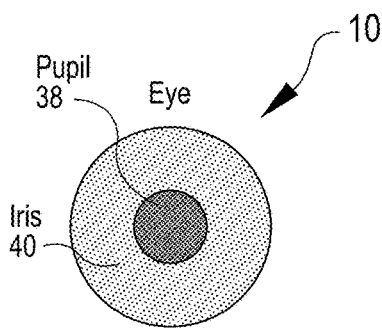
FIG. 23A, FIG. 23B, and FIG. 23C illustrate transmission of light onto a portion of the peripheral retina via central and peripheral zones of an ophthalmic lens.
Figure 23B:
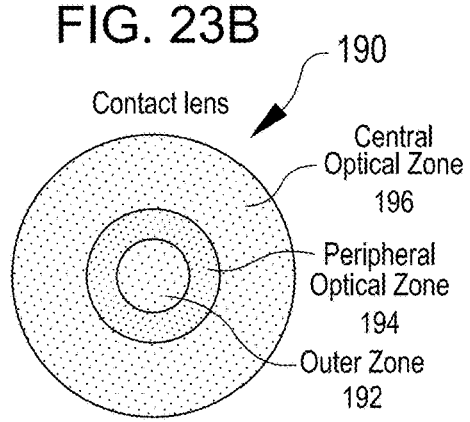
Figure 23C:
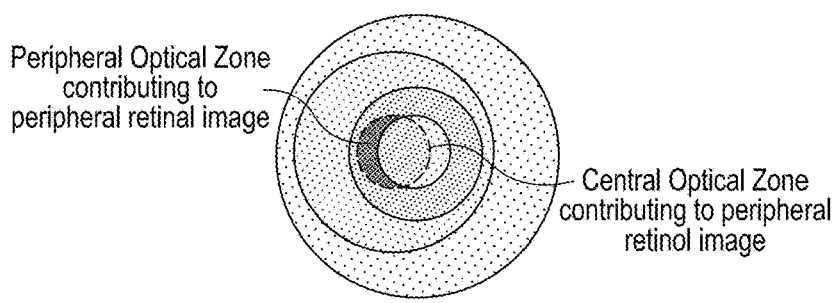

FIG. 23A, FIG. 23B, and FIG. 23C illustrate transmission of light onto a portion of the peripheral retina via central and peripheral zones of an ophthalmic lens. FIG. 23A is a simplified front view of an eye 10 showing the pupil 38 and the surrounding iris 40. FIG. 23B is a simplified front view of an ophthalmic lens 190 that has a central optical zone 192, a peripheral optical zone 194, and an outer zone 196. FIG. 23C is a simplified off-optical-axis view illustrating relative contribution of the peripheral optical zone 194 to a peripheral retinal image and the central optical zone 194 to a peripheral retinal image. In view of the contribution of the central optical zone 194 to a peripheral retinal image, in some embodiments, the optical correction provided by the central optical zone 194 is accounted for when determining a myopia mitigating optical correction for the peripheral optical zone 194. The optical correction provided by the central optical zone 194 can also be based in part on a desired correction to a peripheral retinal image provided by the central optical zone 194.

Figure 24A:
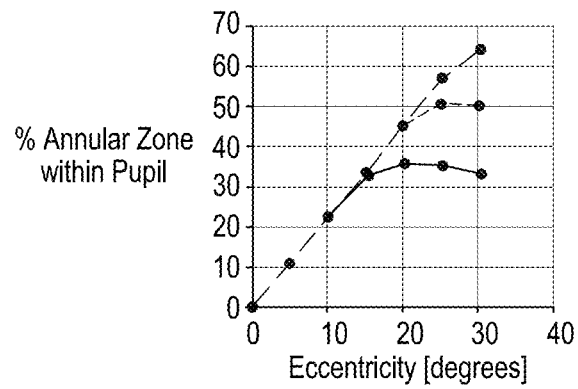
FIG. 24A and FIG. 24B illustrate relative coverage of an example pupil by example annular zones of an ophthalmic lens for different viewing angle eccentricities.
Figure 24B:
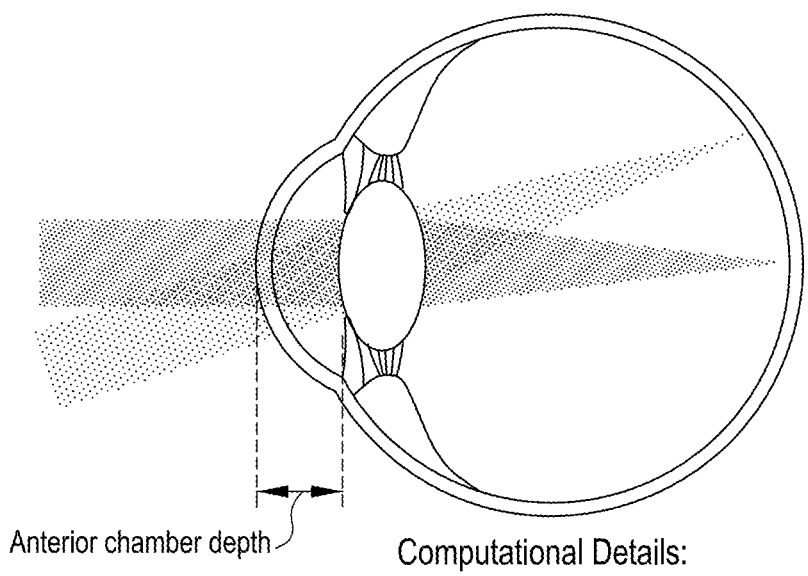

FIG. 24A and FIG. 24B illustrate relative contribution of example peripheral outer zones of an ophthalmic lens to a resulting peripheral retina image. FIG. 24A shows a plot of the percentages of the peripheral annular zone 194 that is within a 4 mm diameter pupil for a 4 mm diameter central optical zone 192. For peripheral viewing eccentricities up to 15 degrees, a 6 mm diameter peripheral annular zone 194 is sufficient in size to maximize the percentage of the peripheral annular zone 194 within the pupil 38. For peripheral viewing eccentricities up to 20 degrees, a 7 mm diameter peripheral annular zone 194 is sufficient in size to maximize the percentage of the peripheral annular zone 194 within the pupil 38. For peripheral viewing eccentricities up to 30 degrees, a 8 mm diameter peripheral annular zone 194 is sufficient in size to maximize the percentage of the peripheral annular zone 194 within the pupil 38. The percentage of the peripheral annular zone 194 within the pupil 38 can be used to guide selection of the inner and outer diameter of the peripheral annular zone 194 for a particular user of the contact lens 24.

FIG. 25 shows example average change in aberrations from 0 degree to 20 degree retinal eccentricity for a group of 10 normal individuals. Retinal image quality was computed, through-focus, in white light for the case of 20 degrees nasal retinal eccentricity (i.e. peripheral visual field). Overall image quality was defined as the average of the horizontal and vertical area under the modulation transfer function (MTF) from 0 to 60 cycles/degree. Optical anisotropy is a measure of the degree rotational asymmetry in retina blur. Optical anisotropy is defined herein as the ratio of horizontal divided by vertical area under the MTF, and was calculated for a 4 mm diameter circular pupil, which is an approximation. At 20 degree nasal retinal eccentricity, a 4 mm diameter pupil is elliptical with a 4 mm vertical axis and a 3.8 mm short (horizontal) axis. 5 The through-focus range evaluated was −3 to +3 diopters in 0.125 diopter increments.

Example Annular Zone Optical Corrections for Inhibiting Myopia Progression

Through focus optical anisotropy and image quality for 20 degree viewing eccentricity plotted in FIG. 26, FIG. 27, FIG. 28, FIG. 29, FIG. 30, and FIG. 31 were calculated for four cases using an annular optical zone that provided 100 percent coverage of a 4 mm diameter pupil. FIG. 24A, however, shows that an annular optical zone with a 4 mm inner diameter covers only about 35-45% of the pupil at 20 degree viewing eccentricity. Accordingly, the through focus optical anisotropy and the image quality for 20 degree viewing eccentricity plotted in FIG. 26, FIG. 27, FIG. 28, FIG. 29, FIG. 30, and FIG. 31 somewhat overestimate the changes in the optical anisotropy and the image quality provided. The 100 percent coverage of the 4 mm diameter pupil by the annular optical zone used was employed for ease of computation.

The four conditions calculated include: (1) a control case 402 of average 20 deg nasal wavefront aberration for 5 mm pupil taken from 10 normal individuals, whose peripheral aberrations were published in Zheleznyak et al., Journal of Vision, 2016; (2) cylinder correction 404 only applied to the control case; (3) a multifocal correction 406 applied to the control case with 1.5 diopters of add power with 0.4 waves of optical phase change; (4) a cylinder correction and the multifocal correction 408 from #3 applied to the control case.

Figure 26:
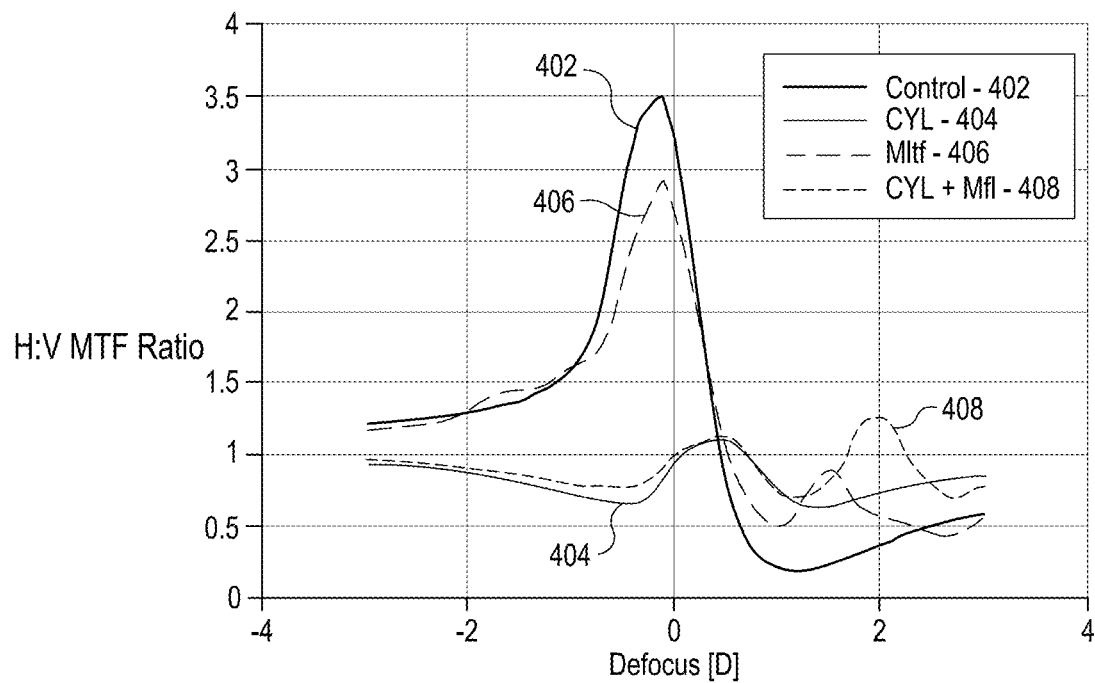
FIG. 26 is a plot of peripheral retinal image symmetry over a range of accommodation levels for example contact lens induced optical corrections.

FIG. 26 is a plot of peripheral retinal image asymmetry (20 degree viewing eccentricity) over a range of accommodation levels for example contact lens induced optical corrections. The x-axis is the defocus or object distance in units of diopters. A diopter is an inverse meter. The y-axis is optical anisotropy, defined as the ratio of the horizontal divided by vertical area-under-the-MTF (between 0 and 60 cyc/deg). A y-axis value of 1 indicates rotational symmetry. A y-axis value of greater than 1 indicates horizontal blur. A y-axis value of less than 1 indicates vertical blur. The control case shows the largest optical anisotropy. The cylinder correction produces a large reduction in the optical anisotropy.

Figure 27:
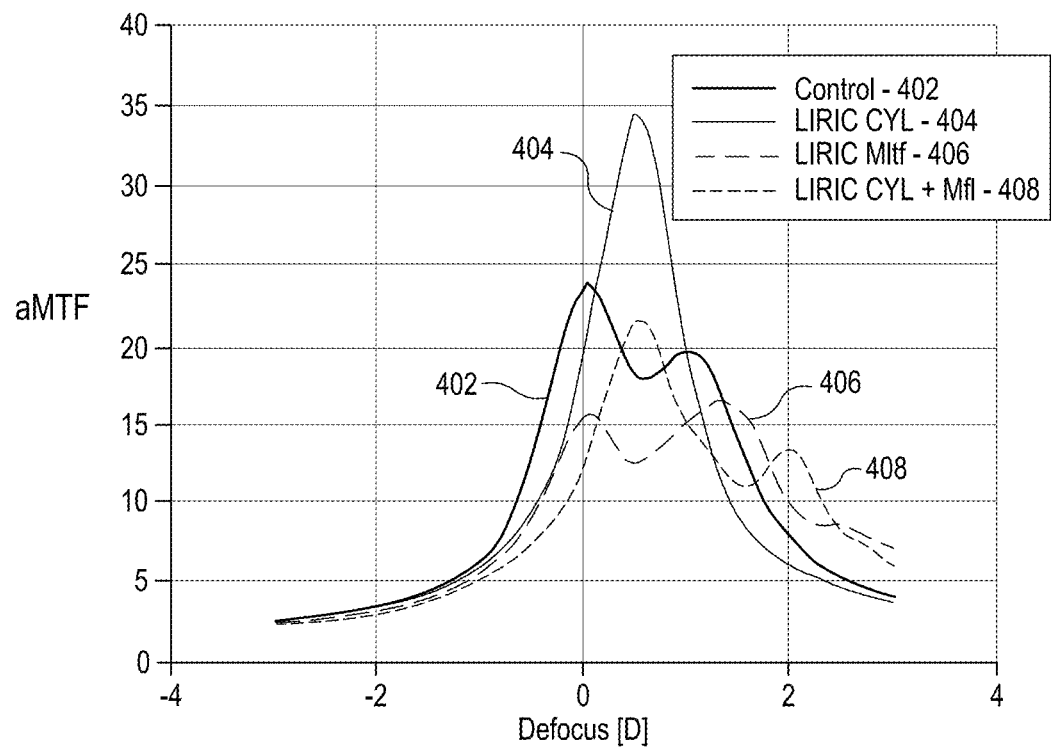
FIG. 27 is a plot of peripheral retinal image quality over a range of accommodation levels for example contact lens induced optical corrections.

FIG. 27 is a plot of peripheral retinal image quality (20 degree viewing eccentricity) over a range of accommodation levels for example contact lens induced optical corrections. The x-axis is the defocus or object distance in units of diopters. The y-axis is retinal image quality, defined as the average of the horizontal and vertical area-under-the-MTF (between 0 and 60 cyc/deg). The larger the y-axis value, the better the image quality. The cylinder correction provides the best peak image quality. The combination of the cylinder correction and the multifocal correction provides the largest depth of focus and the lowest anisotropy (as shown in FIG. 26).

Figure 28:
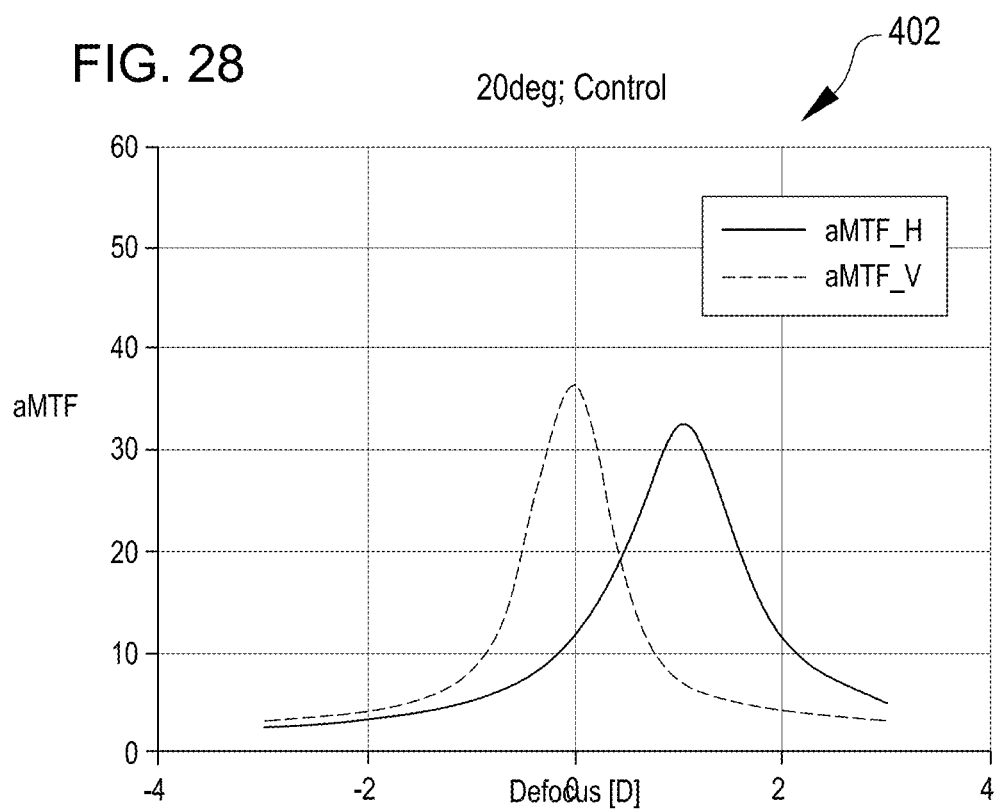
FIG. 28 is a plot of horizontal and vertical peripheral retinal image quality over a range of accommodation levels for an example control case
Figure 29:
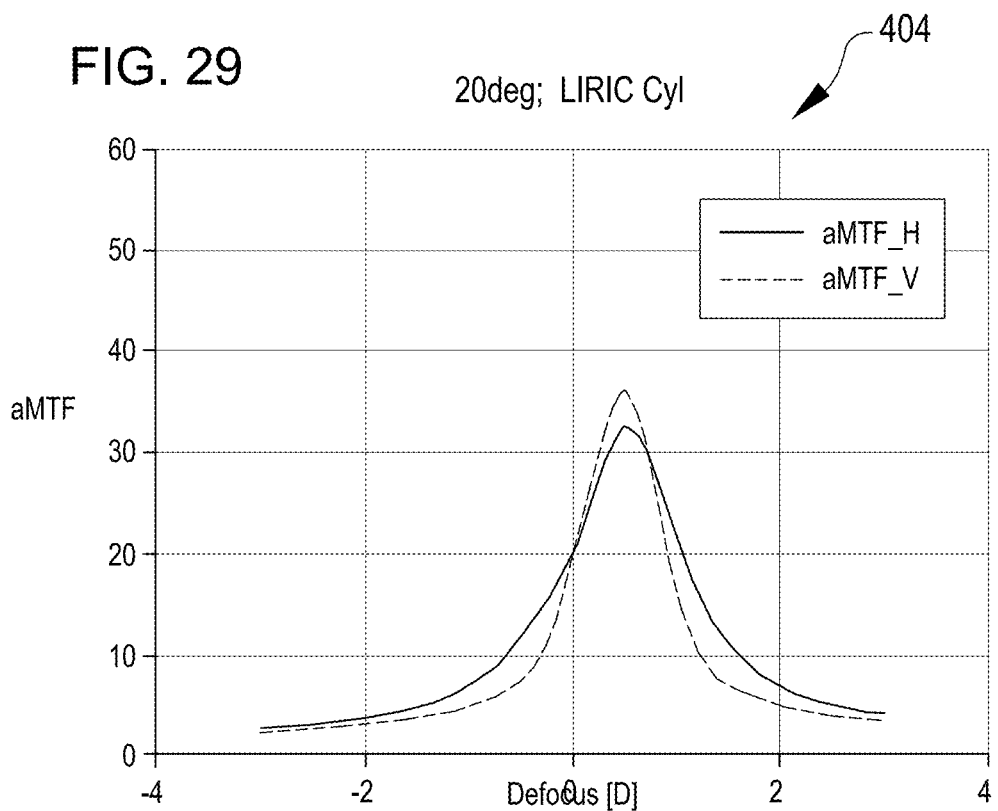
FIG. 29 is a plot of horizontal and vertical peripheral retinal image quality over a range of accommodation levels for the example control case and an ophthalmic lens having subsurface refractive optical elements providing a cylindrical correction.
Figure 30:
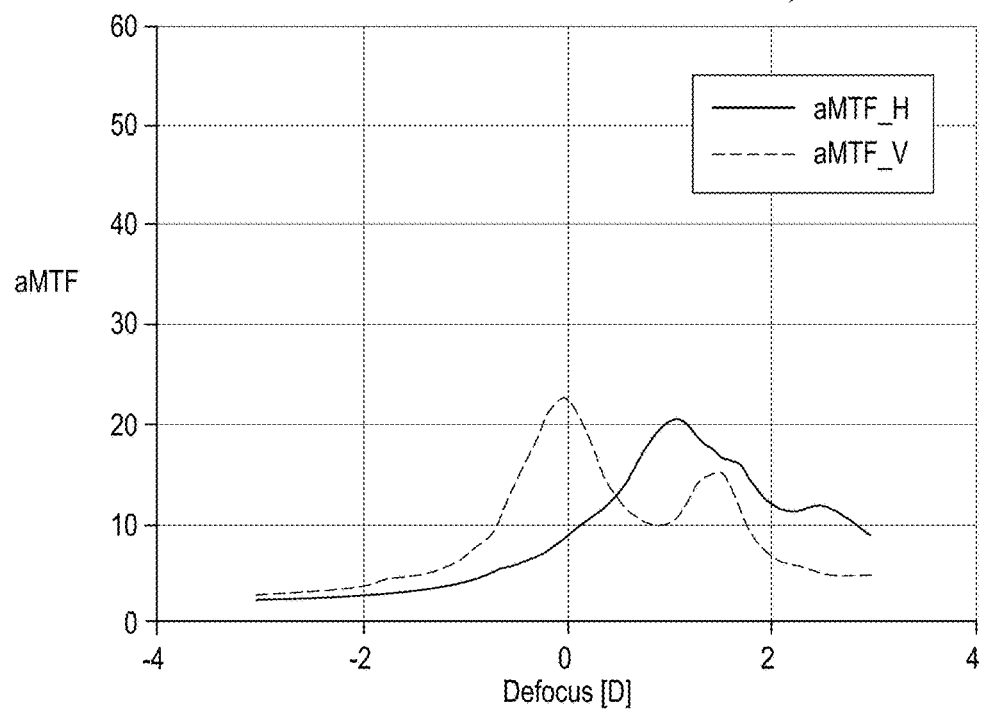
FIG. 30 is a plot of horizontal and vertical peripheral retinal image quality over a range of accommodation levels for the example control case and an ophthalmic lens having subsurface refractive optical elements providing a bifocal correction.
Figure 31:
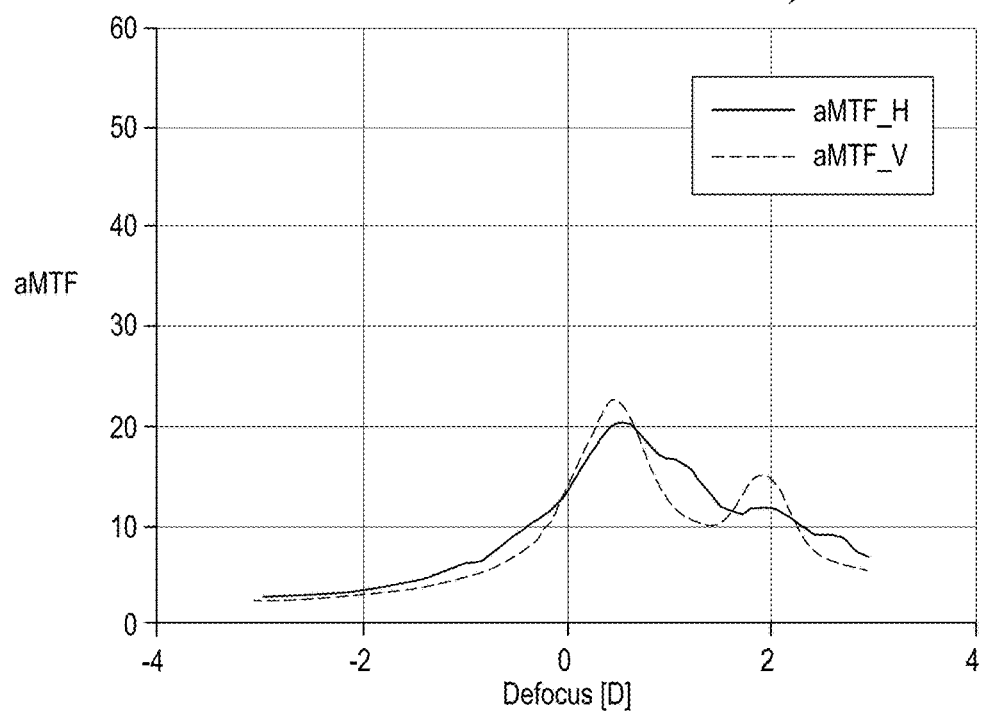
FIG. 31 is a plot of horizontal and vertical peripheral retinal image quality over a range of accommodation levels for the example control case and an ophthalmic lens having subsurface refractive optical elements providing a cylindrical and bifocal correction.

FIG. 28, FIG. 29, FIG. 30, and FIG. 31 are plots of horizontal and vertical peripheral retinal image quality over a range of accommodation levels for the four conditions. FIG. 28 is a plot of horizontal and vertical peripheral retinal image quality over a range of accommodation levels for the control case 402. FIG. 29 is a plot of horizontal and vertical peripheral retinal image quality over a range of accommodation levels for the control case with an ophthalmic lens having subsurface refractive optical elements providing the cylindrical correction 404. FIG. 30 is a plot of horizontal and vertical peripheral retinal image quality over a range of accommodation levels for the control case with an ophthalmic lens having subsurface refractive optical elements providing the bifocal correction 406. FIG. 31 is a plot of horizontal and vertical peripheral retinal image quality over a range of accommodation levels for the control case with an ophthalmic lens having subsurface refractive optical elements providing the cylindrical and bifocal correction 408. The cylinder correction provides the best peak image quality. The combination of the cylinder correction and the multifocal correction provides the largest depth of focus and lowest anisotropy (as shown in FIG. 26).

Any of the ophthalmic lenses 24, 150, 170, 180, 190 described herein can be configured to ensure proper orientation so that each of the annular zones is aligned with the associated region in the peripheral retina. For example, a contact lens can include any one or more suitable design features that cause the contact lens to rotate to the proper orientation on the cornea. In some embodiments, a contact lens is weighted at the bottom to cause the contact lens to rotate to, and maintain, the proper orientation on the cornea so that each of the annular zones in the contact lens is aligned with the associated region in the peripheral retina.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Examples of the embodiments of the present disclosure can be described in view of the following clauses:

Clause 1. An ophthalmic lens including a central zone and an annular zone, wherein the annular zone includes subsurface optical elements formed via laser-induced changes in refractive index of a material forming the annular zone, and wherein the subsurface optical elements are configured to modify distribution of light to a peripheral retina of a user so as to inhibit progression of myopia.

Clause 2. The ophthalmic lens of clause 1, wherein the subsurface optical elements are configured to reduce asymmetry of a radial versus azimuthal contrast in the peripheral retina of the user.

Clause 3. The ophthalmic lens of clause 1, wherein the subsurface optical elements are configured to reduce hyperopia in the peripheral retina of the user.

Clause 4. The ophthalmic lens of clause 1, wherein the subsurface optical elements are configured to increase depth of focus in the peripheral retina of the user.

Clause 5. The ophthalmic lens of clause 1, wherein the subsurface optical elements are configured to decrease depth of focus in the peripheral retina of the user.

Clause 6. The ophthalmic lens of clause 1, wherein the subsurface optical elements are configured to accomplish two or more of: 1) reduce asymmetry of a radial versus azimuthal contrast in the peripheral retina of the user, 2) reduce hyperopia in the peripheral retina of the user, and 3) increase depth of focus in the peripheral retina of the user.

Clause 7. The ophthalmic lens of clause 1, wherein the subsurface optical elements are configured to accomplish two or more of: 1) reduce asymmetry of a radial versus azimuthal contrast in the peripheral retina of the user, 2) reduce hyperopia in the peripheral retina of the user, and 3) decrease depth of focus in the peripheral retina of the user.

Clause 8. The ophthalmic lens of clause 1, wherein the subsurface optical elements are configured to accomplish two or more of: 1) increase asymmetry of a radial versus azimuthal contrast in the peripheral retina of the user, 2) reduce hyperopia in the peripheral retina of the user, and 3) increase depth of focus in the peripheral retina of the user.

Clause 9. The ophthalmic lens of clause 1, wherein the subsurface optical elements are configured to accomplish two or more of: 1) increase asymmetry of a radial versus azimuthal contrast in the peripheral retina of the user, 2) reduce hyperopia in the peripheral retina of the user, and 3) decrease depth of focus in the peripheral retina of the user.

Clause 10. The ophthalmic lens of clause 1, wherein the annular zone comprises two or more annular portions, and wherein the subsurface optical elements in each of the two or more annular portions are configured to accomplish one or both of: 1) reduce asymmetry of a radial versus azimuthal contrast in the peripheral retina of the user; and/or 2) reduce hyperopia in the peripheral retina of the user.

Clause 11. The ophthalmic lens of clause 10, wherein the subsurface optical elements in each of the two or more annular portions are configured to increase depth of focus in the peripheral retina of the user.

Clause 12. The ophthalmic lens of clause 10, wherein the subsurface optical elements in each of the two or more annular portions are configured to decrease depth of focus in the peripheral retina of the user.

Clause 13. The ophthalmic lens of any one of clause 1 through clause 12, configured as a contact lens.

Clause 14. The ophthalmic lens of any one of clause 1 through clause 12, configured as a spectacle lens.

Clause 15. The ophthalmic lens of any one of clause 1 through clause 12, configured as a cornea.

Clause 16. The ophthalmic lens of any one of clause 1 through clause 12, configured as a native lens of an eye.

Clause 17. The ophthalmic lens of any one of clause 1 through clause 12, configured as an intraocular lens.

Clause 18. A method of modifying an ophthalmic lens, the method including inducing subsurface changes in refractive index of a material forming an annular zone of an ophthalmic lens to form subsurface optical elements configured to modify distribution of light to the peripheral retina of a user so as to inhibit progression of myopia.

Clause 19. The method of clause 18, wherein the subsurface optical elements are configured to reduce asymmetry of a radial versus azimuthal contrast in the peripheral retina of the user.

Clause 20. The method of clause 18, wherein the subsurface optical elements are configured to reduce hyperopia in the peripheral retina of the user.

Clause 21. The method of clause 18, wherein the subsurface optical elements are configured to increase depth of focus in the peripheral retina of the user.

Clause 22. The method of clause 18, wherein the subsurface optical elements are configured to decrease depth of focus in the peripheral retina of the user.

Clause 23. The method of clause 18, wherein the subsurface optical elements are configured to accomplish two or more of: 1) reduce asymmetry of a radial versus azimuthal contrast in the peripheral retina of the user, 2) reduce hyperopia in the peripheral retina of the user, and 3) increase depth of focus in the peripheral retina of the user.

Clause 24. The method of clause 18, wherein the subsurface optical elements are configured to accomplish two or more of: 1) reduce asymmetry of a radial versus azimuthal contrast in the peripheral retina of the user, 2) reduce hyperopia in the peripheral retina of the user, and 3) decrease depth of focus in the peripheral retina of the user.

Clause 25. The method of clause 18, wherein the subsurface optical elements are configured to accomplish two or more of: 1) increase asymmetry of a radial versus azimuthal contrast in the peripheral retina of the user, 2) reduce hyperopia in the peripheral retina of the user, and 3) increase depth of focus in the peripheral retina of the user.

Clause 26. The method of clause 18, wherein the subsurface optical elements are configured to accomplish two or more of: 1) increase asymmetry of a radial versus azimuthal contrast in the peripheral retina of the user, 2) reduce hyperopia in the peripheral retina of the user, and 3) decrease depth of focus in the peripheral retina of the user.

Clause 27. The method of clause 18, wherein the changes in the refractive index are induced by subjecting the material to pulses of laser light.

Clause 28. The method of clause 27, wherein each of the pulses of laser light have a duration in a range from 10 femtoseconds to 500 femtoseconds.

Clause 29. The method of clause 28, wherein the laser light has a wavelength of about 405 nm.

Clause 30. The method of clause 28, wherein the laser light has a wavelength of about 810 nm.

Clause 31. The method of clause 28, wherein the laser light has a wavelength of about 1035 nm.

Clause 32. The method of clause 31, wherein each of the pulses of laser light have a duration in a range from 15 femtoseconds to 50 femtoseconds.

Clause 33. The method of clause 18, further comprising measuring a radial versus azimuthal contrast of light incident on a location of the peripheral retina, and wherein the subsurface optical elements are configured to reduce asymmetry of the radial versus azimuthal contrast of the light incident on the location of the peripheral retina.

Clause 34. The method of clause 18, further comprising measuring hyperopia for a location of the peripheral retina, and wherein the subsurface optical elements are configured to reduce hyperopia at the location of the peripheral retina.

Clause 35. The method of clause 18, wherein the annular zone comprises two or more annular portions, and wherein the subsurface optical elements in each of the two or more annular portions are configured to: 1) reduce asymmetry of a radial versus azimuthal contrast in the peripheral retina of the user; and/or 2) reduce hyperopia in the peripheral retina of the user.

Clause 36. The method of clause 35, wherein the subsurface optical elements in each of the two or more annular portions are configured to increase depth of focus in the peripheral retina of the user.

Clause 37. The method of clause 35, wherein the subsurface optical elements in each of the two or more annular portions are configured to decrease depth of focus in the peripheral retina of the user.

Clause 38. The method of any one of clause 18 through clause 37, wherein the ophthalmic lens is a spectacle lens.

Clause 39. The method of any one of clause 18 through clause 37, wherein the ophthalmic lens is a cornea.

Clause 40. The method of any one of clause 18 through clause 37, wherein the ophthalmic lens is a native lens of an eye.

Clause 41. The method of any one of clause 18 through clause 37, wherein the ophthalmic lens is an intraocular lens.

What is claimed is:

1. An ophthalmic lens comprising:
a central zone; and
an annular zone comprising subsurface optical elements formed via laser-induced changes in refractive index in targeted subsurface sub-volumes of the annular zone via laser beam pulses focused onto the targeted subsurface sub-volumes, wherein the subsurface optical elements are configured to modify distribution of light to a peripheral retina of a user so as to inhibit progression of myopia, and wherein the subsurface optical elements are arranged in one or more subsurface layers of the annular zone.

2. The ophthalmic lens of claim 1, wherein the subsurface optical elements are configured to reduce asymmetry of a radial versus azimuthal contrast in the peripheral retina of the user.

3. The ophthalmic lens of claim 1, wherein the subsurface optical elements are configured to reduce hyperopia in the peripheral retina of the user.

4. The ophthalmic lens of claim 1, wherein the subsurface optical elements are configured to increase depth of focus in the peripheral retina of the user.

5. The ophthalmic lens of claim 1, wherein the subsurface optical elements are configured to decrease depth of focus in the peripheral retina of the user.

6. The ophthalmic lens of claim 1, wherein the subsurface optical elements are configured to accomplish two or more of:
reduce asymmetry of a radial versus azimuthal contrast in the peripheral retina of the user;
reduce hyperopia in the peripheral retina of the user; and
increase depth of focus in the peripheral retina of the user.

7. The ophthalmic lens of claim 1, wherein the subsurface optical elements are configured to accomplish two or more of:
reduce asymmetry of a radial versus azimuthal contrast in the peripheral retina of the user;
reduce hyperopia in the peripheral retina of the user; and
decrease depth of focus in the peripheral retina of the user.

8. The ophthalmic lens of claim 1, wherein the subsurface optical elements are configured to accomplish two or more of:
increase asymmetry of a radial versus azimuthal contrast in the peripheral retina of the user;
reduce hyperopia in the peripheral retina of the user; and
increase depth of focus in the peripheral retina of the user.

9. The ophthalmic lens of claim 1, wherein the subsurface optical elements are configured to accomplish two or more of:
increase asymmetry of a radial versus azimuthal contrast in the peripheral retina of the user;
reduce hyperopia in the peripheral retina of the user; and
decrease depth of focus in the peripheral retina of the user.

10. The ophthalmic lens of claim 1, wherein the annular zone comprises two or more annular portions, and wherein the subsurface optical elements in each of the two or more annular portions are configured to accomplish one or both of:
reduce asymmetry of a radial versus azimuthal contrast in the peripheral retina of the user; and/or
reduce hyperopia in the peripheral retina of the user.

11. The ophthalmic lens of claim 10, wherein the subsurface optical elements in each of the two or more annular portions are configured to increase depth of focus in the peripheral retina of the user.

12. The ophthalmic lens of claim 10, wherein the subsurface optical elements in each of the two or more annular portions are configured to decrease depth of focus in the peripheral retina of the user.

13. The ophthalmic lens of claim 1, configured as a contact lens.

14. The ophthalmic lens of claim 1, configured as a spectacle lens.

15. The ophthalmic lens of claim 1, configured as a cornea.

16. The ophthalmic lens of claim 1, configured as a native lens of an eye.

17. The ophthalmic lens of claim 1, configured as an intraocular lens.

18. The ophthalmic lens of claim 1, wherein at least one of the one or more subsurface layers of the subsurface optical elements has a phase-wrapped configuration.

19. The ophthalmic lens of claim 18, wherein the phase-wrapped configuration has a fractional number phase-wrapped configuration.

* * * * *